(12) United States Patent
Kim et al.

(10) Patent No.: US 10,827,357 B2
(45) Date of Patent: Nov. 3, 2020

(54) METHOD FOR CONTROLLING SERVICE SET FOR WIRELESS LAN AND APPARATUS THEREFOR

(71) Applicant: Samsung Electronics Co., Ltd, Suwon-si (KR)

(72) Inventors: Moonsoo Kim, Seoul (KR); Seonghwan Kim, Incheon (KR); Jun-Young Park, Suwon-si (KR); Kiyeong Jeong, Chungcheongnam-do (KR); In-Sick Jung, Suwon-si (KR); Junyeop Jung, Yongin-si (KR); Sunkey Lee, Seongnam-si (KR); Jong-Mu Choi, Gunpo-si (KR); Doosuk Kang, Suwon-si (KR); Bokun Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/478,796

(22) PCT Filed: Jan. 16, 2018

(86) PCT No.: PCT/KR2018/000743
§ 371 (c)(1),
(2) Date: Jul. 17, 2019

(87) PCT Pub. No.: WO2018/135836
PCT Pub. Date: Jul. 26, 2018

(65) Prior Publication Data
US 2020/0059834 A1     Feb. 20, 2020

(30) Foreign Application Priority Data
Jan. 17, 2017   (KR) .......................... 10-2017-0008067

(51) Int. Cl.
*H04W 36/00* (2009.01)
*H04W 12/08* (2009.01)
(Continued)

(52) U.S. Cl.
CPC ... *H04W 12/0802* (2019.01); *H04W 12/0804* (2019.01); *H04W 36/0038* (2013.01);
(Continued)

(58) Field of Classification Search
CPC ......... H04W 12/0802; H04W 36/0072; H04W 36/0038; H04W 12/0804; H04W 48/02
See application file for complete search history.

(56) References Cited

U.S. PATENT DOCUMENTS

| | | | |
|---|---|---|---|
| 2009/0028120 A1* | 1/2009 | Lee ........................ | H04W 48/16 370/338 |
| 2009/0147893 A1* | 6/2009 | Takahashi ........... | H04L 25/0328 375/346 |

(Continued)

FOREIGN PATENT DOCUMENTS

| | | |
|---|---|---|
| WO | 2016/167438 A1 | 10/2016 |
| WO | 2017/003847 A1 | 1/2017 |

OTHER PUBLICATIONS

"8021 1r, 802.11K, 802.11V, 802.11w Fast Transition Roaming", Enterprise Mobility 8.1. Design Guide, Jul. 11, 2017, 28 pages.
(Continued)

*Primary Examiner* — Asad M Nawaz
*Assistant Examiner* — Syed Ali

(57) ABSTRACT

The purpose of the present invention is to control a service set in a wireless communication system. The wireless communication system comprises: a first access point (AP) comprising a first wireless fidelity (WiFi) communication circuit for providing a first basic service set (BSS); and a second AP comprising a second WiFi communication circuit
(Continued)

for providing a second BSS. The first WiFi communication circuit wirelessly receives, from a first mobile station, a first connection request including information on a wireless LAN standard of the first mobile station, wirelessly provides a second mobile station with at least a part of the information, wirelessly receives, from the second mobile station, an approval of a connection of the first mobile station thereto, and after receiving the approval, disconnects a first wireless connection from the first mobile station. The second WiFi communication circuit wirelessly receives an approval from the second mobile station, wirelessly receives a second connection request from the first mobile station, establishes a second wireless connection with the first mobile station on the basis of the approval, and exchanges data with the first mobile station through the second wireless connection. Other embodiments are also possible.

10 Claims, 25 Drawing Sheets

(51) Int. Cl.
*H04W 48/02* (2009.01)
*H04W 84/12* (2009.01)
(52) U.S. Cl.
CPC ....... *H04W 36/0072* (2013.01); *H04W 48/02* (2013.01); *H04W 84/12* (2013.01)

(56) References Cited

U.S. PATENT DOCUMENTS

| 2010/0166186 | A1 | 7/2010 | Shiba | |
| 2015/0327150 | A1* | 11/2015 | Jung | H04W 40/12 |
| | | | | 370/254 |
| 2015/0351014 | A1* | 12/2015 | Jung | H04W 48/16 |
| | | | | 370/338 |
| 2016/0249267 | A1 | 8/2016 | Ho et al. | |
| 2017/0289987 | A1* | 10/2017 | Seok | H04W 72/0406 |
| 2017/0303245 | A1* | 10/2017 | Asterjadhi | H04L 43/0894 |
| 2018/0054818 | A1* | 2/2018 | Kakani | H04W 72/0446 |
| 2018/0098378 | A1* | 4/2018 | Patil | H04W 88/10 |
| 2018/0184365 | A1* | 6/2018 | Gidvani | H04W 48/16 |
| 2018/0288743 | A1 | 10/2018 | Choi et al. | |
| 2019/0007977 | A1* | 1/2019 | Asterjadhi | H04W 74/006 |
| 2019/0200387 | A1* | 6/2019 | Chitrakar | H04W 74/0816 |
| 2019/0208462 | A1* | 7/2019 | Patil | H04W 52/0216 |
| 2019/0208502 | A1* | 7/2019 | Du | H04B 7/155 |

OTHER PUBLICATIONS

Abhijit Sarma et al., "Deciding Handover Points Based on Context-Aware Load Balancing in a WiFi-WiMAX Heterogeneous Network Environment", IEEE Transactions on Vehicular Technology, vol. 65, No. 1, Jan. 2016, p. 348-357.
International Search Report dated Apr. 30, 2018 in connection with International Patent Application No. PCT/KR2018/000743, 2 pages.
Written Opinion of the International Searching Authority dated Apr. 30, 2018 in connection with International Patent Application No. PCT/KR2018/000743, 6 pages.

* cited by examiner

Blacklist 910

| index | bssid |
|---|---|
| 1 | 06:34:56:78:65:65 |
| 2 | 88:0B:65:DC:00:C0 |
| ... | ... |

Whitelist 930

| index | bssid |
|---|---|
| 1 | 06:34:56:78:65:66 |
| 2 | 88:0B:65:DC:00:C1 |
| ... | ... |

FIG.9

METHOD FOR CONTROLLING SERVICE SET FOR WIRELESS LAN AND APPARATUS THEREFOR

CROSS-REFERENCE TO RELATED APPLICATIONS

This application is a 371 of International Application No. PCT/KR2018/000743 filed on Jan. 16, 2018, which claims priority to Korean Patent Application No. 10-2017-0008067 filed on Jan. 17, 2017, the disclosures of which are herein incorporated by reference in their entirety.

BACKGROUND

1. Field

The disclosure relates to a wireless local area network (WLAN) service and, more particularly, to a method for controlling a service set for a WLAN.

2. Description of Related Art

The development of wireless communication technology is one significant innovation in modern society. To support wireless communication systems, various communication standards may be used, among which IEEE 802.11 or wireless fidelity (Wi-Fi) may be used as a communication standard.

In a Wi-Fi network, mobile stations may be connected to an access point (AP) to transmit and receive data. With limited radio resources, the AP may have difficulty in efficiently providing data to connected mobile stations.

Various embodiments of the disclosure may provide a method and an electronic device for controlling a base service set (BSS) in a wireless communication system.

Various embodiments of the disclosure may provide a method and an electronic device for functionally classifying and managing a plurality of BSSs.

Various embodiments of the disclosure may provide a method and an electronic device for providing high throughput to a mobile station.

Various embodiments of the disclosure may provide a method and an electronic device for enabling a mobile station to efficiently perform disconnection from APs and to establish a connection to APs.

SUMMARY

A wireless communication system according to various embodiments of the disclosure may include: a first access point (AP) configured to include a first wireless fidelity (Wi-Fi) communication circuit providing a first basic service set (BSS); and a second AP configured to include a second Wi-Fi communication circuit providing a second BSS, wherein the first Wi-Fi communication circuit may: wirelessly receive a first connection request from a mobile station; wirelessly exchange credential information with the mobile station; block a wireless connection with the mobile station after exchanging the credential information; and provide at least some of the credential information to the second AP, and the second Wi-Fi communication circuit may: receive at least the some of the credential information from the first AP; wirelessly receive a second connection request from the mobile station; establish a wireless connection with the mobile station using at least the some of the credential information without exchanging additional credential information with the mobile station; and exchange data with the mobile station through the established wireless connection.

A device of an AP according to various embodiments of the disclosure may include: a communication unit configured to wirelessly receive a connection request from a mobile station and to wirelessly exchange credential information with the mobile station; and a processor configured to block a wireless connection with the mobile station after exchanging the credential information. The communication unit may provide at least some of the credential information to a second AP so that the second AP may establish a wireless connection with the mobile station without exchanging additional credential information with the mobile station.

A device of an AP according to various embodiments of the disclosure may include: a communication unit configured to receive at least some credential information from a first AP and to receive a connection request from a mobile station; and a processor configured to establish a wireless connection with the mobile station, in response to the connection request, using at least the some of the credential information without exchanging additional credential information with the mobile station. The communication unit may exchange data with the mobile station through the wireless connection.

A wireless communication system according to various embodiments of the disclosure may include: a first AP configured to include a first Wi-Fi communication circuit to provide a first BSS; and a second AP configured to include a second Wi-Fi communication circuit to provide a second BSS, wherein the first Wi-Fi communication circuit may: wirelessly receive, from a first mobile station, a first connection request including information about a WLAN standard of the first mobile station; wirelessly provide at least part of the information to a second mobile station; wirelessly receive an approval for a connection to the first mobile station from the second mobile station; and block a first wireless connection with the first mobile station after receiving the approval, and the second Wi-Fi communication circuit may: wirelessly receive the approval from the second mobile station; wirelessly receive a second connection request from the first mobile station; establish a second wireless connection with the first mobile station on the basis of the approval; and exchange data with the first mobile station through the second wireless connection.

A device of an AP in a wireless communication system according to various embodiments of the disclosure may include: a communication unit configured to wirelessly receive, from a first mobile station, a first connection request including information about a Wi-Fi protocol version of the first mobile station, to wirelessly provide at least part of the information to a second mobile station, and to wirelessly receive an approval for a connection to the first mobile station from the second mobile station; and a processor configured to block a first wireless connection with the first mobile station after receiving the approval and to establish a second wireless connection between the first mobile station and a second AP.

A device of an AP in a wireless communication system according to various embodiments of the disclosure may include: a communication unit configured to wirelessly receive an approval for a connection of a first mobile station to the AP from a second mobile station and to wirelessly receive a connection request from the first mobile station; and a controller configured to establish a wireless connection with the first mobile station on the basis of the approval, wherein the communication unit may exchange data with the mobile station through the wireless connection.

An operating method of an AP in a wireless communication system according to various embodiments of the disclosure may include: receiving at least some credential information from a first AP; receiving a connection request from a mobile station; establishing a wireless connection with the mobile station using at least the some of the credential information without exchanging additional credential information with the mobile station in response to the connection request; and exchanging data with the mobile station through the wireless connection.

An operating method of an AP in a wireless communication system according to various embodiments of the disclosure may include: wirelessly receiving a first connection request including information about a Wi-Fi protocol version of a first mobile station from the first mobile station; wirelessly providing at least part of the information to a second mobile station; wirelessly receiving an approval for a connection to the first mobile station from the second mobile station; establishing a second wireless connection between the first mobile station and a second AP by blocking a first wireless connection with the first mobile station after receiving the approval.

According to the disclosure, at least one access point (AP) may functionally classify and manage a plurality of basic service sets (BSSs), thereby providing high throughput for a mobile station and enabling a mobile station to efficiently perform a handover between APs.

BRIEF DESCRIPTION OF THE DRAWINGS

FIG. 9 illustrates a list for controlling a connection of a mobile station to an AP according to various embodiments of the disclosure;

DETAILED DESCRIPTION

Figure 1:
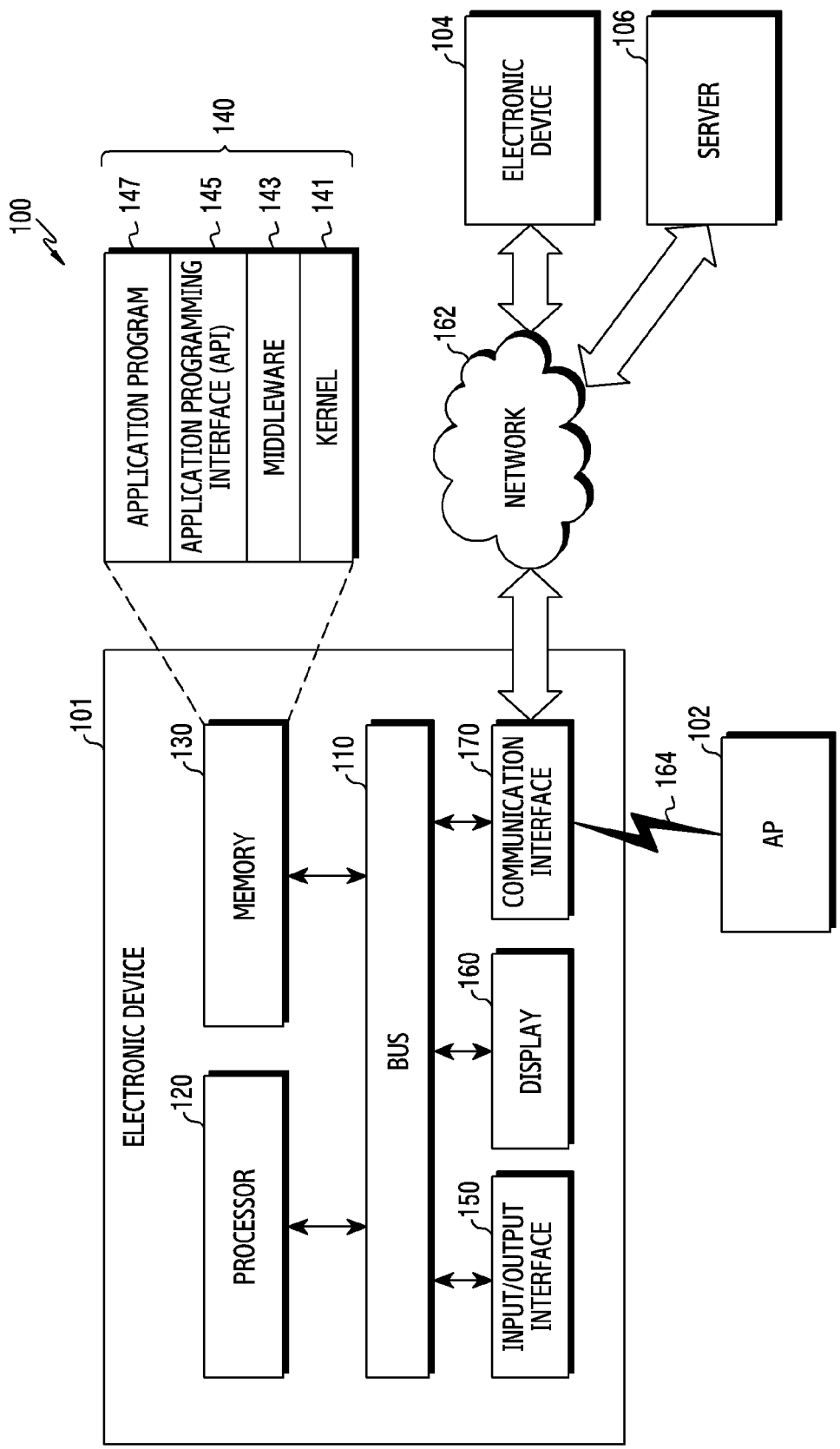
FIG. 1 illustrates a network environment including an electronic device according to various embodiments of the disclosure.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

According to various embodiments, the processor 120 may transmit a connection request to the AP 102 via the communication interface 170. The processor 120 may exchange control information (e.g., credential information) and/or data with the AP 102 via the communication interface 170. In one example, the processor 120 may control the communication interface 170 to transmit a connection request signal to the AP 102.

According to various embodiments, the processor 120 may receive a request message from the AP 102 via the communication interface 170. The processor 120 may transmit a response message to the AP 102 via the communication interface 170 in response to the request. In one example, the processor 120 may control the communication interface 170 to transmit a response message to the AP 102 in response to the request message received from the AP 102.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101. According to various embodiments, the memory 130 may store credential information exchanged between the electronic device 101 and the AP 102.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

The external electronic device 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
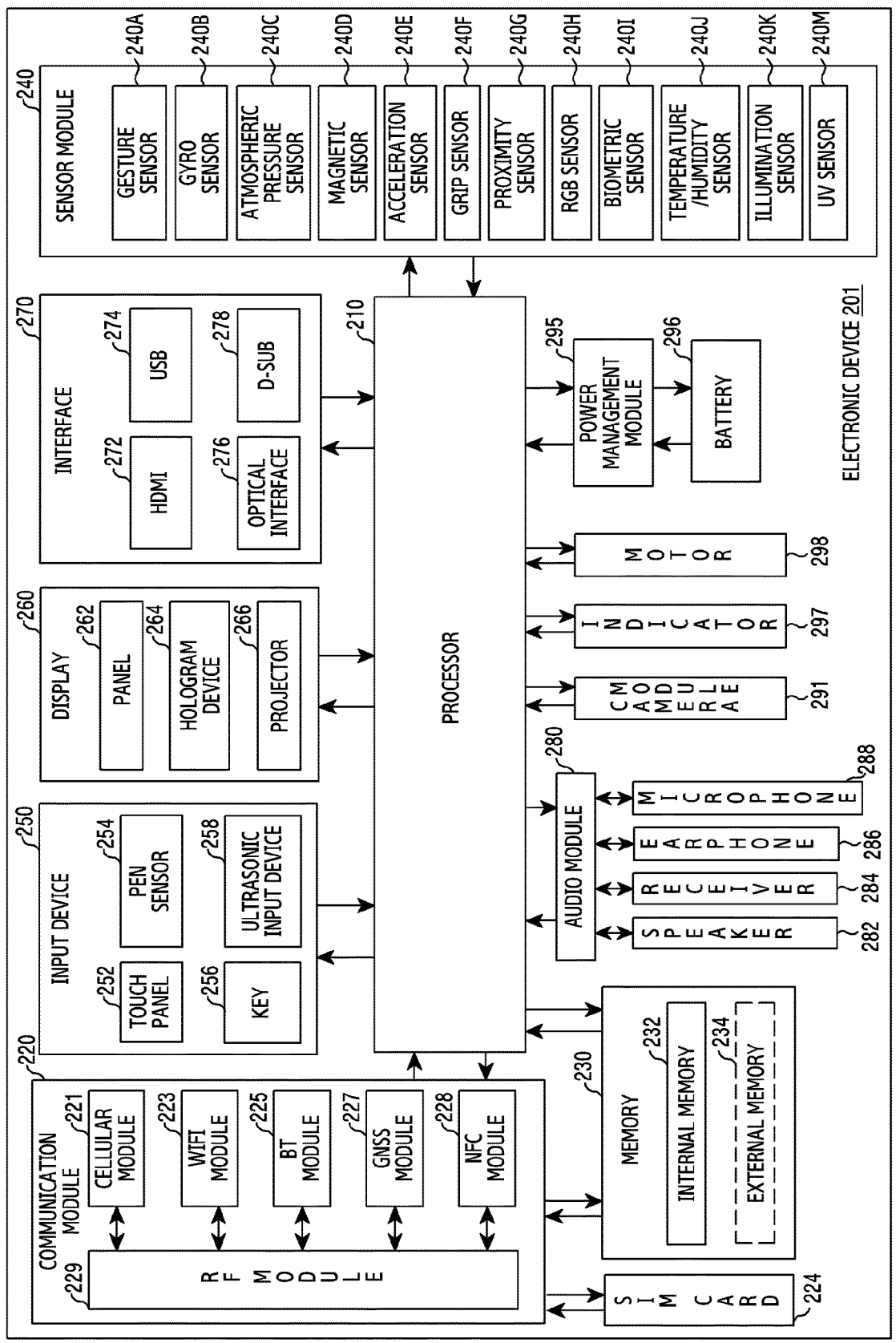
FIG. 2 is a block diagram illustrating an electronic device according to various embodiments of the disclosure.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

According to various embodiments, the processor 210 may control the communication module 220 to transmit a connection request to the AP. The processor 210 may exchange control information (e.g., credential information) and/or data with the AP 102 via the communication module 220. In addition, the processor 210 may control the communication module 220 to receive a request message from the AP 102. The processor 210 may control the communication module 220 to transmit a response message to the AP 102 in response to the request message received from the AP 102.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

According to various embodiments, the memory 230 may store credential information exchanged between the AP and the electronic device 210.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, a display driver interface (DDI) 268, and/or a control circuit for controlling them. The panel 262 may, for example, be implemented to be flexible, transparent, or wearable. The panel 262 may be constructed as one or more modules together with the touch panel 252. According to one embodiment, the panel 262 may include a pressure sensor (or force sensor) to measure the strength of pressure from a user's touch. The pressure sensor may be formed with the touch panel 252 in a single body, or may be provided as one or more sensors separate from the touch panel 252.

The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
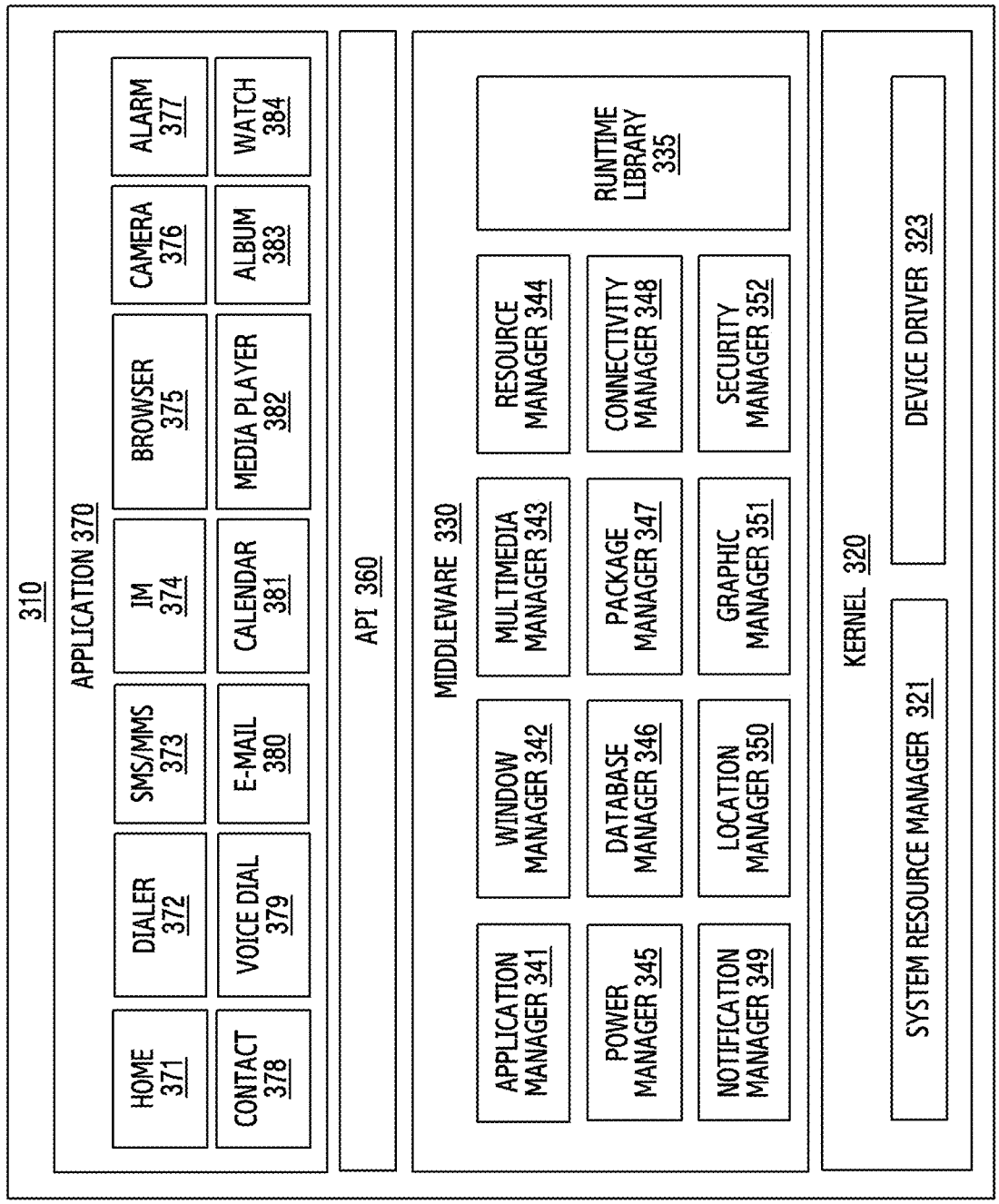
FIG. 3 is a block diagram illustrating a program module according to various embodiments of the disclosure.

FIG. 3 illustrates a block diagram of a program module according to various embodiments.

According to an embodiment, the program module 310 (e.g., the program 140) may include an operating system (OS) controlling resources related to an electronic device (e.g., the electronic device 101) and/or various applications (e.g., the application program 147) run on the operating system. The operating system may, for example, include Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323. The system resource manager 321 may perform control of a system resource, allocation thereof, or recovery thereof. According to an embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, or an inter-process communication (IPC) driver. The middleware 330 may, for example, provide a function that the application 370 needs in common, or provide various functions to the application 370 through the API 360 wherein the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may obtain a format used for playing media files, and perform encoding or decoding of the media file by using a codec suitable to the corresponding format. The resource manager 344 may manage a source code of the application 370 or a space of a memory. The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS). The database manager 346 may, for example, provide, search or change a database that will be used in the application 370. The package manager 347 may manage the installing or refining of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to the user, or a user interface related with this. The security manager 352 may, for example, provide system security or user authentication. According to an embodiment, the middleware 330 may include a telephony manager for managing a voice or video call function of the electronic device, or a middleware module capable of forming a combination of functions of the aforementioned constituent elements. According to an embodiment, the middleware 330 may provide a module that is specialized by type of an operating system. The middleware 330 may dynamically delete some of the existing constituent elements, or add new constituent elements. The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device. For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device. According to an embodiment, the application 370 may include an application (e.g., a health care application of a mobile medical instrument) designated according to properties of the external electronic device. According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The electronic device 101 may use a wireless local area network (WLAN) service through an AP (e.g., the AP 102). To this end, the AP establishes a wireless network, and the wireless network may be referred to as a basic service set (BSS). For example, the AP manages a BSS and may control a connection procedure of a mobile station. The performance of a WLAN service may be improved by managing a BSS. Accordingly, various embodiments of the disclosure relate to a BSS management technology for effectively providing a WLAN service.

Hereinafter, terms used in the disclosure are defined as follows.

An 'access point (AP)' is a device that provides a connection to a network for a mobile station and may be a device that enables a mobile station to exchange data with a network. For example, an AP may provide a mobile station with a Wireless Fidelity (Wi-Fi) network according to the communication standards of IEEE 802.11, and the mobile station may transmit and receive data through the Wi-Fi network provided by the Wi-Fi AP. Hereinafter, the term 'AP' used herein may be replaced with a 'wireless router', a 'wireless line sharer, or a 'Wi-Fi router'.

A 'WLAN standard' may refer to a communication standard used when a mobile station and/or an AP performs Wi-Fi communication with each other. For example, a WLAN standard may refer to any one of IEEE 802.11a, IEEE 802.11b, IEEE 802.11g, IEEE 802.11n, IEEE 802.11ac, IEEE 802.11ad, IEEE 802.11k, IEEE 802.11r, and IEEE 802.11v.

A 'supported WLAN standard' may refer to the highest version of WLAN standards that a mobile station can support. For example, when a WLAN standard that a mobile station can support is IEEE 802.11n, the mobile station can also support IEEE 802.11a/b/g, which are lower versions than IEEE 802.11n, but a supported WLAN standard corresponds to IEEE 802.11n that is the highest version.

A 'basic service set' (BSS) is a configuration unit of a wireless network and may refer to a set including at least one AP and mobile stations associated with the at least one AP. For example, a BSS may refer to at least one AP and mobile stations associated therewith in a WLAN using IEEE 802.11.

A 'high-speed device' may refer to a device capable of achieving relatively high throughput. A 'low-speed device' may refer to a device capable of achieving relatively low throughput. Here, a low-speed device and a high-speed device may be distinguished on the basis of the achievable transmission rate according to a supported WLAN standard regardless of capabilities of other hardware (e.g., memory capacity, processor performance, or the like) of the devices. For example, when a first device can support IEEE 802.11ac as a WLAN standard for communication with an AP and a second device can support IEEE 802.11b as a WLAN standard for communication with the AP, the first device can achieve high throughput (=6.9 Gbps) corresponding to 802.11ac protocols, and the second device can achieve relatively low throughput (=11 MBps) corresponding to IEEE 802.11b protocols, and thus the first device may be a high-speed device and the second device may be a low-speed device.

A 'whitelist' may refer to a list of mobile stations allowed to access a particular BSS. For example, when it is determined that a mobile station is allowed to access a particular BSS, an AP may register the identifier (ID) of the mobile station in a whitelist for the particular BSS.

A 'blacklist' refers to a list of mobile stations not allowed to access a particular BSS. For example, when it is determined that a mobile station is not allowed to access a particular BSS, an AP may register the ID of the mobile station in a blacklist for the particular BSS.

Figure 4:
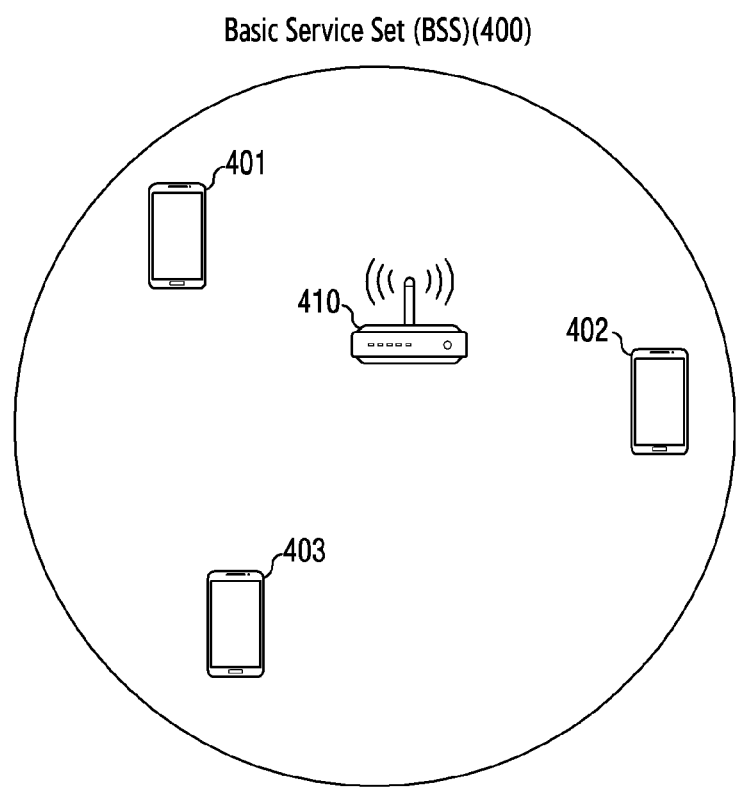
FIG. 4 illustrates the configuration of a basic service set (BSS) according to various embodiments of the disclosure.

FIG. 4 illustrates the configuration of a basic service set (BSS) according to various embodiments of the disclosure. Referring to FIG. 4, the BSS 400 may include one AP 410 and a plurality of mobile stations 401, 402, and 403. However, this configuration is provided for illustrative purposes, and there is no limit to the number of APs and mobile stations included in the BSS 400.

The AP 410 (e.g., the AP 102 in FIG. 1) may provide a connection to a network for each of the plurality of mobile stations 401, 402, and 403. Each of the plurality of mobile stations 401, 402, and 403 (e.g., the electronic device 101 of FIG. 1 or the electronic device 201 of FIG. 2) may transmit data to the network or may receive data from the network via the AP 410. The plurality of mobile stations 401, 402, and 403 may use an agreed communication protocol with the AP 410 for communication with the AP 410. For example, when the AP 410 and the plurality of mobile stations 401, 402, and 403 operate in a Wi-Fi network, the AP 410 and the plurality of mobile stations 401, 402, and 403 may communicate using a communication protocol according to IEEE 802.11.

According to various embodiments of the disclosure, a WLAN standard that each of the plurality of mobile stations 401, 402, and 403 can support to access and communicate with the AP 410 may be different for each mobile station. For example, a first mobile station 401 may be a low-speed device capable of supporting up to the IEEE 802.11b WLAN standard, while a second mobile station 402 and a third mobile station 403 may be high-speed devices capable of supporting up to the IEEE 802.11ac WLAN standard. In another example, the first mobile station 401 may be a low-speed device capable of supporting up to the IEEE 802.11g WLAN standard, while the second mobile station 402 and the third mobile station 403 may be high-speed devices capable of supporting up to the IEEE 802.11n WLAN standard.

According to an embodiment, when the plurality of mobile stations 401, 402, and 403 and the AP 410 included in the BSS 400 can support the same WLAN standard, the plurality of mobile stations 401, 402, and 403 and the AP 410 can achieve throughput corresponding to the WLAN standard. For example, when the plurality of mobile stations 401, 402, and 403 and the AP 410 included in the BSS 400 all support the IEEE 802.11ac WLAN standard, all radio resources may be used for communication using the IEEE 802.11ac WLAN standard in the network of the BSS 400, and thus each of the plurality of mobile stations 401, 402, and 403 can achieve throughput (=6.9 Gbps) corresponding to IEEE 802.11ac. When the plurality of mobile stations 401, 402, and 403 and the AP 410 included in the BSS 400 can support the same WLAN standard, each of the plurality of mobile stations 401, 402, and 403 can transmit and receive data with the maximum throughput that each mobile station can achieve.

According to one embodiment, when the plurality of mobile stations 401, 402, and 403 can support different WLAN standards, for example, when some of the plurality of mobile stations 401, 402, and 403 are low-speed devices and the other thereof are high-speed devices, some devices may not be able to achieve the maximum throughput that the devices can achieve. For example, the first mobile station 401 supports the IEEE 802.11g WLAN standard, and both the second mobile station 402 and the third mobile station 403 support the IEEE 802.11ac WLAN standard (e.g., when the first mobile station 401 is a low-speed device, and the second mobile station 402 and the third mobile station 403 are high-speed devices), all radio resources cannot be used for communication using the IEEE 802.11ac WLAN standard in the network of the BSS 400 and some radio resources may be allocated for communication using the IEEE 802.11g WLAN standard in order to support the first mobile station 401. As the number of radio resources for the IEEE 802.11ac WLAN standard are reduced, the second mobile station 402 and the third mobile station 403, which are high-speed devices, cannot achieve the maximum throughput (=6.9 Gbps) corresponding to IEEE 802.11ac. For example, when the BSS 400 includes a plurality of mobile stations 401, 402, and 403 that support different WLAN standards, mobile stations using higher-version Wi-Fi protocols cannot transmit and receive data with the maximum throughput that the mobile stations can achieve. For example, when all of the plurality of mobile stations 401, 402, and 403 included in the BSS 400 are high-speed devices and a low-speed device is newly added to the BSS 400, the throughput of the plurality of mobile stations 401, 402, and 403 transmitting and receiving data may be reduced.

Various embodiments of the disclosure may provide an operating method of an AP and an electronic device for preventing a decrease in the throughput of some mobile stations when the BSS 400 includes a plurality of mobile stations 401, 402, and 403 that support different WLAN standards. For example, various embodiments of the disclosure may provide an operating method of an AP in which at least one AP manages a plurality of BSSs and determines whether to include each mobile station in a BSS for providing communication using a high WLAN standard among a plurality of BSSs according to a WLAN standard that each mobile station can support, and an electronic device therefor. A plurality of BSSs may be managed by one AP or by a plurality of APs respectively associated with the plurality of BSSs, which will be described in detail with reference to FIG. 5 and FIG. 6.

Figure 5:
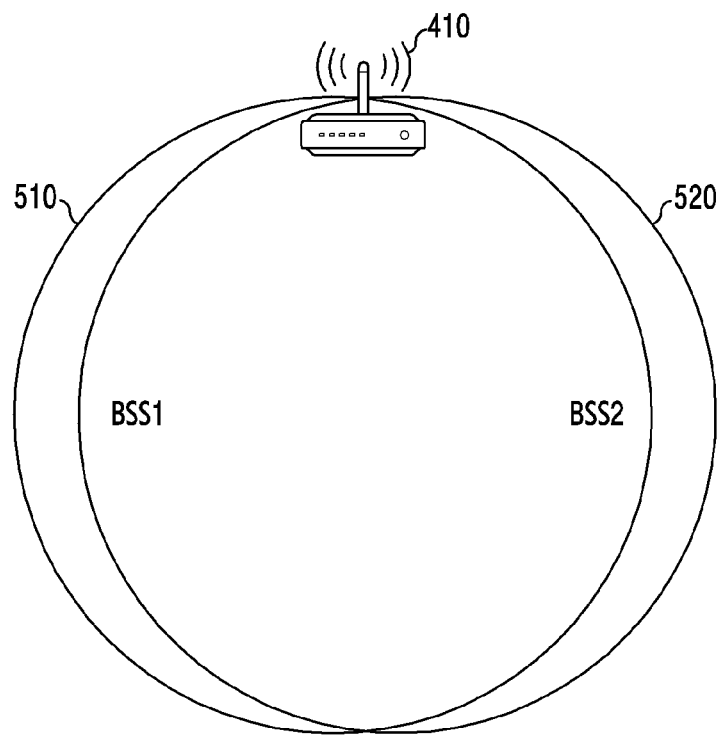
FIG. 5 illustrates a case where one access point (AP) operates a plurality of BSSs according to various embodiments of the disclosure.

FIG. 5 illustrates a case where one AP operates a plurality of BSSs according to various embodiments of the disclosure.

Referring to FIG. 5, one AP 410 (e.g., the AP 410 in FIG. 4) may manage BSS1 510 (e.g., the BSS 400 in FIG. 4) and BSS2 520 (e.g., the BSS 400 in FIG. 4). Two circles shown in FIG. 5 are for distinguishing BSS1 510 from BSS2 520, not for indicating a geographical area for communication with mobile stations included in BSS1 510 or a geographical area for communication with mobile stations included in BSS2 520. Although FIG. 5 shows that the AP 410 manages two BSSs including BSS1 510 and BSS2 520, this is provided for illustrative purposes. Instead, the AP 410 may manage three or more BSSs including BSS1 510 and BSS2 520. BSS1 510 and the BSS2 520 may be distinguished on the basis of a media access control (MAC) address. For example, when BSS1 510 and BSS2 520 are different, a MAC address of BSS1 510 and an MAC address of BSS2 520 may be different.

As illustrated in FIG. 5, when one AP 410 manages BSS1 510 and BSS2 520, the AP 410 may transmit both a frame for BSS1 510 and a frame for BSS2 520. A specific example in which one AP 410 transmits frames for a plurality of BSSs is described in detail with reference to FIG. 6.

Figure 6:
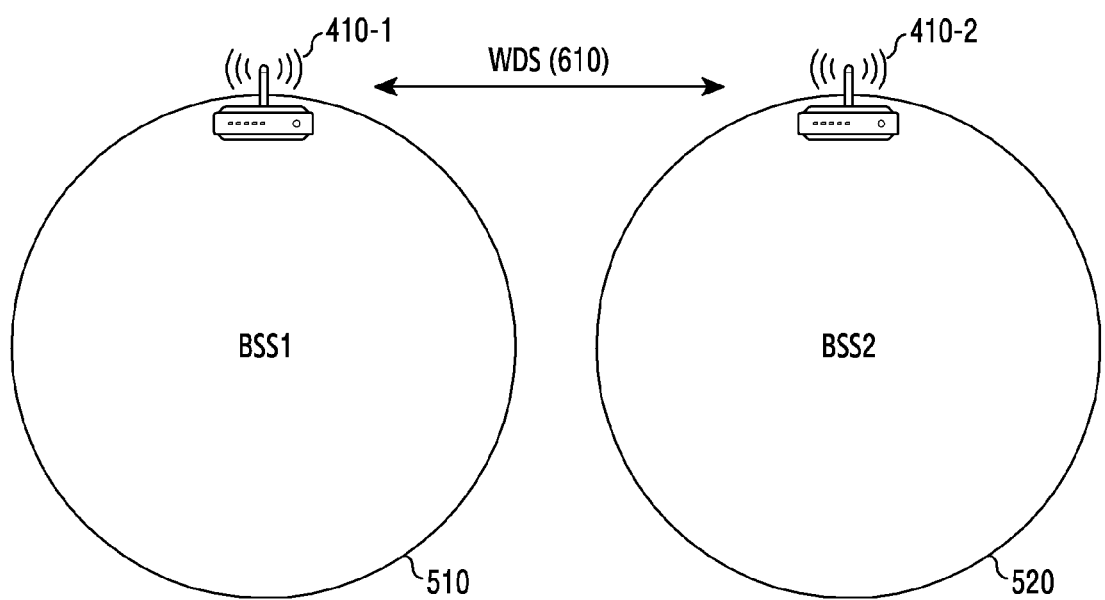
FIG. 6 illustrates a case where a plurality of APs operates respective BSSs according to various embodiments of the disclosure.

FIG. 6 illustrates a case where a plurality of APs operates respective BSSs according to various embodiments of the disclosure.

According to FIG. 6, one AP may manage one BSS. For example, different BSSs may be managed by different APs, respectively. FIG. 6 illustrates two APs, AP1 410-1 and AP2 410-2, in which API 410-1 may manage BSS1 510 and AP2 410-2 may manage BSS2 520. Two circles shown in FIG. 6 are for distinguishing BSS1 510 from BSS2 520, not for indicating a geographical area for communication with mobile stations included in BSS1 510 (e.g., the BSS 400 in FIG. 4) or a geographical area for communication with mobile stations included in BSS2 520 (e.g., the BSS 400 in FIG. 4).

According to various embodiments of the disclosure, a wireless connection may be established by a wireless distribution system (WDS) between AP1 410-1 (e.g., the AP 410 in FIG. 4) and AP2 410-2 (e.g., the AP 410 in FIG. 4), and AP1 410-1 and AP2 410-2 may exchange information through the WDS. For example, AP1 410-1 and AP2 410-2 may exchange information stored in AP1 410-1 and AP2 410-2 or may exchange information that AP1 410-1 and AP2 410-2 receive from a mobile station through the wireless connection therebetween. Although not shown, each of AP1 410-1 and AP2 410-2 may manage a BSS (hereinafter, referred to as BSS3) for the WDS so that AP1 410-1 and the AP2 410-2 perform communication through the WDS. For example, when AP1 410-1 and AP2 410-2 perform communication via the WDS, AP1 410-1 may transmit a frame for BSS1 510 and a frame for BSS3 and AP2 410-2 may transmit a frame for BSS2 520 and a frame for BSS3. A specific example in which API 410-1 and AP2 410-2 transmit frames for a plurality of BSSs when performing communication via the WDS will be described in detail with reference to FIG. 20. According to other embodiments of the disclosure, AP1 410-1 and AP2 410-2 may be connected via a cable. In this case, since AP1 410-1 and AP2 410-2 may use a wired connection for mutual communication instead of a connection via the WDS, AP1 410-1 and AP2 410-2 may not manage BSS3.

In the following description, it is assumed that one AP manages one BSS and a plurality of BSSs is managed by different APs as shown in FIG. 6. Accordingly, a mobile station connected to AP1 410-1 may belong to BSS1 510, and a mobile station connected to AP2 410-2 may be included in BSS2 520. However, this assumption is merely for the convenience of explanation, and the same description may also apply to a case where one AP manages a plurality of BSSs. When one AP manages a plurality of BSSs, signal exchange performed between APs in the following embodiments may be understood as data exchange/processing inside APs.

According to various embodiments of the disclosure, a wireless communication system may include BSS1 510 and BSS2 520 managed by API 410-1 and AP2 410-2, respectively. BSS2 520 may be a BSS that dedicatedly performs data communication to provide high throughput for mobile stations belonging to BSS2 520. BSS1 510 may be a BSS that controls whether to include a mobile station in BSS2 520. In the following description, a BSS that dedicatedly performs data communication is referred to as a 'data-only BSS', and a BSS that controls whether to include a mobile station in a data-only BSS is referred to as a 'gatekeeper BSS'. Also, an AP that manages a gatekeeper BSS is referred to as a gatekeeper AP, and an AP that manages a data-only BSS is referred to as a 'data-communication AP', a 'data-only AP', or a 'data AP'. For example, when BSS1 510 is a gatekeeper BSS and BSS2 520 is a data-only BSS, AP1 410-1 managing BSS1 510 may be a gatekeeper AP and AP2 410-2 managing BSS2 520 may be a data-communication AP. A gatekeeper BSS/AP may be referred to as an 'access management BSS/AP', an 'access control BSS/AP', an 'access BSS/AP', or other terms having equivalent technical meanings. A data only BSS/AP may be referred to as a 'data communication BSS/AP', a 'traffic BSS/AP', a 'data BSS/AP', or other terms having equivalent technical meanings.

According to one embodiment, BSS2 520 may include mobile stations having a relatively high WLAN standard. Accordingly, the mobile stations belonging to BSS2 520 can achieve high throughput corresponding to the high WLAN standard. In order to maintain the high throughput of the mobile stations belonging to BSS2 520, AP2 410-2 may provide data communication only for particular mobile stations that are allowed to access AP2 410-2. To this end, AP2 410-2 may manage a whitelist and may allow access of only mobile stations registered in the whitelist of AP2 410-2. For example, AP2 410-2 may allow access of a mobile station having a high supported WLAN standard or may allow limited access of a mobile station having a low supported WLAN standard. When AP2 410-2 manages one BSS2 520, a mobile station allowed to access AP2 410-2 may be considered as belonging to BSS2 520.

According to one embodiment, AP1 410-1 as a gatekeeper AP may be used to determine whether to allow a mobile station to access AP2 410-2. Unlike AP2 410-2, AP1 410-1 may allow access of a mobile station regardless of WLAN standards supported by the mobile station. AP1 410-1 may receive a connection request from a mobile station, may establish a connection with the mobile station according to the connection request, and may control connection of the mobile station to AP2 410-2. The connection request that AP1 410-1 receives from the mobile station may include information about a WLAN standard that the mobile station can support. AP1 410-1 may control the mobile station not to be connected to AP2 410-2 according to the supported WLAN standard of the mobile station (e.g., when the WLAN standard is low). For example, when a mobile station having a relatively low supported WLAN standard is newly included in BSS2 520 that is managed by AP2 410-2 and includes a mobile station having a relatively high supported WLAN standard, the throughput of existing mobile stations included in BSS2 520 may be reduced, and thus AP1 410-1 may control the mobile station having the relatively low WLAN standard not to be connected to AP2 410-2.

According to one embodiment, an operation in which AP1 410-1 controls connection of a mobile station to AP2 410-2 may be as follows. AP1 410-1 may transmit information for indicating an attempt of a mobile station to access AP2 410-2 to an administrator device. The information for indicating the attempt of the mobile station to access AP2 410-2 may include information about a WLAN standard that the mobile station can support. The administrator device is, for example, a device for determining whether to allow the mobile station to access AP2 410-2 and may be AP2 410-2, one of a plurality of mobile stations connected to AP2 410-2, or a device not connected to AP2 410-2. For example, when the administrator device is one of a plurality of mobile stations connected to AP2 410-2, AP1 410-1 may transmit the information for indicating the attempt of the mobile station to access AP2 410-2 to the administrator device through AP2 410-2.

According to one embodiment, the administrator device may determine whether to allow the mobile station to access AP2 410-2 on the basis of the information received from AP1 410-1. For example, the administrator device may detect an input from a user and may determine whether to allow the mobile station to access AP2 410-2 on the basis of the detected input. The administrator device may display a message indicating that there is the attempt of the mobile station to connect via a display. For example, the message may include information about the WLAN standard of the mobile station that attempts to connect, information indication that a low-speed device attempts to connect, or a user interface (UI, e.g., a button) for receiving an input about whether to allow access. In another embodiment, the administrator device may determine whether to allow the mobile station to access AP2 410-2 without receiving any input from the user. For example, the administrator device may determine whether to allow the mobile station to access AP2 410-2 on the basis of the WLAN standard supported by the mobile station that attempts to connect the number of mobile stations currently connected to AP2 410-2, the operation state thereof, or the required quality of service (QoS) level thereof.

According to one embodiment, when the administrator device permits the mobile station to access AP2 410-2, the administrator device may transmit an access approval message indicating that access is permitted to API 410-1. For example, when the administrator device is one of a plurality of mobile stations connected to AP2 410-2, the administrator device may transmit an access approval message of the mobile station to AP2 410-2, and AP2 410-2 may transmit the access approval message of the mobile station to API 410-1. When API 410-1 receives the access approval message, the mobile station that attempts to connect may be registered in a blacklist of API 410-1 and may also be registered in a whitelist of AP2 410-2. When the mobile station is registered in the blacklist of API 410-1 and is registered in the whitelist of AP2 410-2, the mobile station may be disconnected from API 410-1 and may be connected to AP2 410-2. The mobile station and AP2 410-2 may exchange data through the established wireless connection.

According to one embodiment, AP2 410-2 may activate a function corresponding to a particular WLAN standard in order to communicate with a mobile station. For example, when a new mobile station using a relatively low WLAN standard enters BSS2 520 in which all of AP2 410-2 and a plurality of mobile stations use the same WLAN standard, AP2 410-2 may activate a function corresponding to the low WLAN standard in order to serve the new mobile station.

According to one embodiment, when the administrator device does not permit the mobile station to access AP2 410-2, the mobile station cannot access AP2 410-2 and may maintain a connection with AP1 410-1.

According to one embodiment, to establish a connection between a mobile station and an AP, the mobile station and the AP may exchange credential information. The credential information may include, for example, a network security type provided by the AP, a service set identifier (SSID), a password for a mobile station to access the AP, a cryptographic key, a key generated by the AP, a public key, and an authentication message generated by a user input (e.g., Wi-Fi Protected Setup (WPS) or a personal identification number (PIN)). An operation of exchanging the credential information between the mobile station and the AP is similar to an operation in which the mobile station performs authentication in order to connect to the AP and may include an operation in which both the AP and the mobile station perform corresponding agreed operations. When credential information is properly exchanged between the mobile station and the AP, a connection may be established between the mobile station and the AP. The mobile station and the AP may store the exchanged credential information. After the mobile station is disconnected from the AP, when the mobile station requests a connection to the same AP again, the mobile station and the AP already have the credential information for establishing a connection therebetween, thus reestablishing a connection without additionally exchanging the credential information. For example, for the AP providing credential information to be exchanged for connection establishment that is the same as previously exchanged credential information, the mobile station may establish a connection without further exchanging credential information.

According to various embodiments of the disclosure, AP1 410-1 may provide at least some credential information about the mobile station to AP2 410-2 so that the mobile station is quickly connected to AP2 410-2. For example, AP1 410-1 may provide AP2 410-2 with at least some of the credential information exchanged with the mobile station in an operation of connecting with the mobile station. When the administrator device allows access of the mobile station to AP2 410-2 and thus the mobile station is disconnected from AP1 410-1, the mobile station may attempt to connect to AP2 410-2 having the same SSID. For example, AP1 410-1 and AP2 410-2 may have the same SSID through the exchange of at least some of the credential information including an SSID. The mobile station may attempt to connect to AP2 410-2 among AP1 410-1 and AP2 410-2 having the same SSID instead of AP1 410-1 which forcibly disconnects the mobile station therefrom through the registration of the mobile station in the blacklist. Since the mobile station, AP1 410-1, and AP2 410-2 have at least some of the same credential information through the exchange of the credential information, AP2 410-2 may establish a connection with the mobile station using the credential information provided from AP 410-1 without additionally exchanging the credential information with the mobile station. The mobile station and AP2 410-2 may exchange data through the established connection.

According to one embodiment, even though a connection is established between the mobile station and AP2 410-2, when an event occurs such that the mobile station departs from the coverage of the AP2 410-2, the mobile station may be disconnected from AP2 410-2. When the mobile station is disconnected from AP2 410-2 for a certain period of time, AP2 410-2 may prevent the mobile station from being reconnected to AP2 410-2. For example, the mobile station may be deleted from the whitelist of AP2 410-2. The mobile station may be deleted from the blacklist of AP1 410-1. Thus, when the mobile station reenters the coverage of AP1 410-1 and/or AP2 410-2, the foregoing operations may be performed again.

When the mobile station is allowed to access AP2 410-2, an operation in which the mobile station is disconnected from AP1 410-1 and connects to AP2 410-2 may be performed as follows.

According to one embodiment, the mobile station is disconnected from AP1 410-1 as the mobile station is registered in the blacklist of AP1 410-1. The mobile station may attempt to connect to AP2 410-2. An operation of the mobile station attempting to connect to AP2 410-2 may include an operation of performing authentication between the mobile station and AP2 410-2. For example, the mobile station may perform authentication with AP2 410-2 on the basis of the credential information exchanged between AP1 410-1 and AP2 410-2 in order to attempt to connect to AP2 410-2. When the authentication is completed, the mobile station may be connected to AP2 410-2. AP2 410-2 may identify the MAC address of the mobile station to authenticate the mobile station. As described above, since the mobile station is disconnected from a source AP, performs authentication with a target AP, and is then connected to the target AP, there may be a period in which the mobile station is disconnected while performing authentication.

According to one embodiment, as in a case where the mobile station, AP1 410-1, and AP2 410-2 support the IEEE 802.11r/k/v WLAN standards, the mobile station may perform disconnection from AP1 410-1 and connection to AP2 410-2 without disconnection. For example, the mobile station may obtain identification (ID) information of AP2 410-2 (e.g., the BSSID of BSS2 520) as a target AP from AP1 410-1 and may be connected to AP2 410-2 using the ID information without any additional authentication operation. Further, the mobile station does not perform an additional authentication procedure to connect with AP2 410-2 and may thus be connected to AP2 410-2 without terminating the connection with AP1 410-1. As described above, an operation in which a mobile station is connected to a target AP without terminating a connection with a source AP may be referred to as roaming.

Figure 7A:
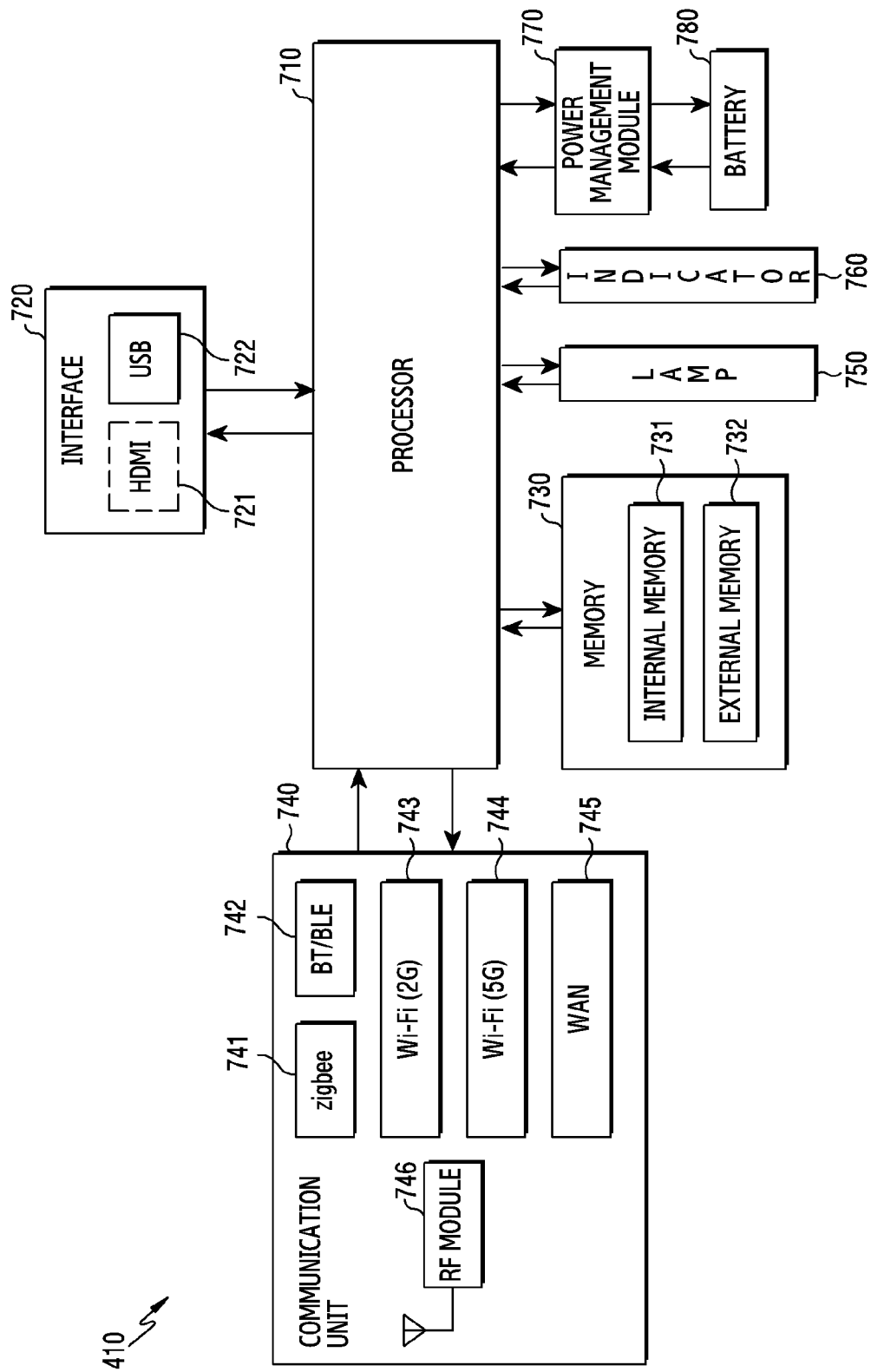
FIG. 7A is a block diagram illustrating an AP device according to various embodiments of the disclosure.
Figure 7B:
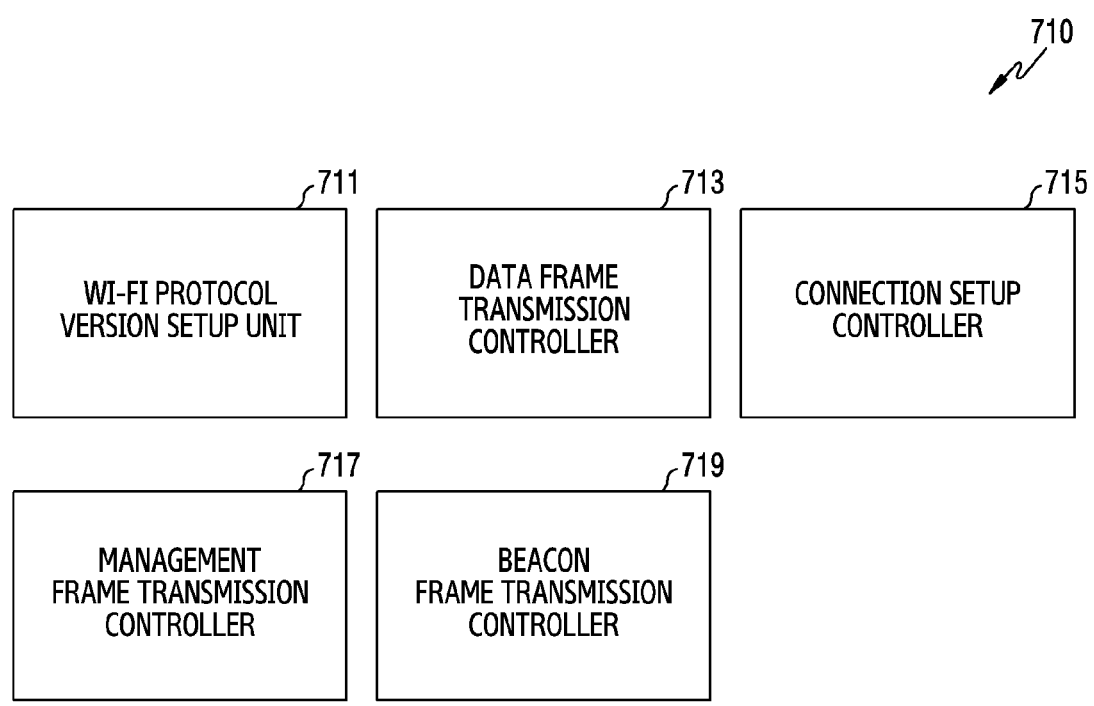
FIG. 7B illustrate various modules included in a processor of a gatekeeper AP according to various embodiments of the disclosure.

FIG. 7A and FIG. 7B illustrate the configuration of an AP device for performing operations according to various embodiments of the disclosure.

FIG. 7A is a block diagram illustrating an AP 410 (e.g., the AP 410 of FIG. 4) according to various embodiments of the disclosure. The terms 'unit, '-or/er', and the like used herein indicate a unit for processing at least one function or operation, which may be implemented by hardware, software, or a combination of hardware and software. The AP 410 includes device components illustrated in FIG. 7A regardless of whether the AP is API 410-1 as a gatekeeper AP or AP2 410-2 as an AP for data communication. Referring to FIG. 7A, the AP 410 may include a processor 710 (e.g., an application processor), an interface 720, a memory 730, a communication unit 740, a lamp 750, an indicator 760, a power management module 770, and a battery 780. According to one embodiment, the AP 410 may be the same as or similar to the electronic device 101 of FIG. 1 or the electronic device 201 of FIG. 2.

According to one embodiment, the processor 710 (e.g., the processor 120 or the processor 210) may control the interface 720, the memory 730, the communication unit 740, the lamp 750, the indicator 760, and the power management module 770 which are functionally coupled with the processor 710. For example, the processor 710 may control the reception of a forward channel signal and the transmission of a reverse channel signal using the communication unit 740. In some embodiments, the processor 710 may include at least one microprocessor or microcontroller.

According to one embodiment, the processor 710 may execute a process or program stored in the memory 730. The processor 710 may move data to the memory 730 or may import data from the memory 730 as required by an execution process. In some embodiments, the processor 710 may be configured to execute an application in response to a signal received on the basis of an OS.

According to one embodiment, the interface 720 is a medium for establishing a wired or wireless connection with another device and may include, for example, an HDMI 721 and a USB 722. Although the interface 720 is illustrated as being separate from the communication unit 740 in FIG. 7, the interface 720 may be included in the communication unit 740.

According to one embodiment, the memory 730 may be electrically connected to the processor 710. The memory 730 may include, for example, an internal memory 731 or an external memory 732. The internal memory 731 may include, for example, at least one of a volatile memory (for example, a DRAM, a SRAM, a SDRAM, or the like) and a nonvolatile memory (for example, a one-time programmable ROM (OTPROM), a PROM, an EPROM, an EEPROM, a mask ROM, a flash ROM, a flash memory, a hard drive, or a solid-state drive (SSD)). The external memory 732 may include a flash drive, for example, a compact flash (CF), a Secure digital (SD), a micro-SD, a mini-SD, an extreme digital (xD), a multi-media card (MMC), a memory stick, or the like. The external memory 732 may be functionally or physically connected to the AP 410 through any of various interfaces.

According to various embodiments, the memory 730 may store a blacklist and/or a whitelist of at least one mobile station. The memory 730 may store credential information exchanged with a mobile station through the communication unit 740 or credential information received from another AP device.

According to one embodiment, the communication unit 740 may receive a radio frequency (RF) signal. To this end, the communication unit 740 may include at least one radio frequency module. The communication unit 740 may down-convert a received signal to generate an intermediate frequency (IF) or baseband signal. The communication unit 740 may include a reception processing circuit that filters, decodes, and/or digitalizes a baseband or IF signal to generate a processed baseband signal. The reception processing circuit may transmit the processed baseband signal to a speaker for audio data or to the processor 710 for further processing (e.g., web browsing data).

According to one embodiment, the communication unit 740 may include at least one transceiver. The at least one transceiver may receive outgoing baseband data (e.g., web data, e-mail, or interactive video game data) from the processor 710. A transmission processing circuit may encode, multiplex, or digitize outgoing baseband data in order to generate a processed baseband or IF signal. The communication unit 740 may upconvert an outgoing processed baseband or IF signal into an RF signal to be transmitted via an antenna through a transmission processing circuit.

According to one embodiment, the communication unit 740 includes a ZigBee module 741, a Bluetooth/Bluetooth Low Energy (BT/BLE) module 742, a WLAN chip 743 supporting a 2 GHz band, a WLAN chip 744 supporting a 5 GHz band, and a WAN module 745. The communication unit 740 may communicate with an external device using a communication standard corresponding to each of the Zig-Bee module 741, the BT/BLE module 742, the WLAN chip 743 supporting the 2 GHz band, the WLAN chip 744 supporting the 5 GHz band, and the WAN module 745.

According to one embodiment, the lamp 750 and/or the indicator 760 may display a specific state of the 410 or a component thereof (e.g., the processors 710), which may be, for example, a booting state, a message state, a network connection state, or a charging state.

According to one embodiment, the power management module 770 may manage the power of the AP 410. According to one embodiment, the power management module 770 may include a power management integrated circuit (PMIC), a charger IC, or a battery or fuel gauge. The PMIC may have wired and/or wireless charging methods. The wireless charging methods may include, for example, a magnetic resonance method, a magnetic induction method, or an electromagnetic wave method. The power management module 770 may further include an additional circuit for wireless charging, such as a coil loop, a resonance circuit, or a rectifier. The battery gauge may measure, for example, the remaining battery charge, the charging voltage, the current, or temperature of the battery 780. The battery 780 may include, for example, a rechargeable battery and/or a solar battery.

The components of the AP 410 shown in FIG. 7A are provided for illustrative purposes, and some components may be omitted. In addition, the AP 410 may include an additional component. For example, the AP 410 may further include a user input module and a display module. According to various embodiments of the disclosure, the processor 710 may control the display module to display a message indicating that a mobile station attempts to connect to the AP 410. The processor 710 may control the user input module to receive an input to determine whether to allow access of the mobile station that has attempted to connect. The device components shown in FIG. 7A may perform an integrated function along with other components. For example, a combination including at least one of the processor 710 and the communication unit 740 may be referred to as a Wi-Fi communication circuit and may perform both a function of the processor 710 and a function of the communication unit 740.

FIG. 7B illustrates various modules included in a processor 710 of a gatekeeper AP according to various embodiments of the disclosure. Referring to FIG. 7B, the processor 710 of AP1 410-1 as a gatekeeper AP includes a WLAN standard setup unit 711 (e.g., Wi-Fi protocol version setup unit), a data frame transmission controller 713, a connection setup controller 715, a management frame transmission controller 717, and a beacon frame transmission controller 719. For example, the WLAN standard setup unit 711, the data frame transmission controller 713, the connection setup controller 715, the management frame transmission controller 717, and the beacon frame transmission controller 719 may be, as an instruction set or a code stored in the memory 730, instructions/codes at least transitorily residing in the processor 710 or storage spaces that stores the instructions/codes, or may be part of circuitry that constitutes the processor 710.

According to one embodiment, the WLAN standard setup unit 711 may configure AP1 410-1 to transmit and receive a frame according to any supported WLAN standard (e.g., IEEE 802.11a/b/g/n/ac/ad). AP1 410-1 may transmit and receive a frame according to any WLAN standard, thereby detecting a connection request from a mobile station regardless of WLAN standards supported by the mobile station.

According to one embodiment, the data frame transmission controller 713 may control AP1 410-1 not to perform data transmission and reception. AP1 410-1, which is the gatekeeper AP, is for controlling access of a mobile station to AP2 410-2 by detecting a connection request from the mobile station control, and may enable AP2 410-2 as a data-communication AP to efficiently transmit and receive data by not performing data transmission and reception. In order to control AP1 410-1 not to perform data transmission and reception, the data frame transmission controller 713 may control AP1 410-1 to transmit only a management frame used for a mobile station to connect and to maintain a connection without transmitting a data frame, for example, by controlling a configuration of the Wi-Fi modules 743 and 744, or may restrict transmission and reception of a data packet by modifying a communication path using a kernel.

According to one embodiment, the connection setup controller 715 may control access of a mobile station currently connected to AP1 410-1 to AP2 410-2 as a data communication-only AP. For example, the connection setup controller 715 may transmit information for AP1 410-1 to indicate an attempt of the mobile station to access AP2 410-2 to an administrator device. When AP 410-1 receives an approval for an access attempt from the administrator device, the connection setup controller 715 may add the mobile station to a blacklist of AP1 410-1 and a whitelist of AP2 410-2 so that the mobile station establishes a connection to AP2 410-2.

According to one embodiment, the management frame transmission controller 717 may control whether AP1 410-1 transmits a frame other than the management frame or a frequency with which AP1 410-1 transmits the management frame. The management frame may be used to detect a connection request from a mobile station that is not connected with AP1 410-1 or to maintain a connection of a mobile station already connected to AP1 410-1. Since AP1 410-1 as the gatekeeper AP is required to detect a connection request from a mobile station but is not required to transmit and receive data to and from the mobile station, the management frame transmission controller 717 may control AP1 410-1 not to transmit a frame other than the management frame.

According to one embodiment, the beacon frame transmission controller 719 may control a cycle on which AP1 410-1 transmits a beacon frame. A beacon frame is a type of management frame and may include information about an AP transmitting a beacon frame and a BSS of the AP transmitting the beacon frame, information necessary for a mobile station to access an AP transmitting a beacon frame, or scheduling information about a frame buffered in an AP transmitting a beacon frame. For example, when there are a relatively large number of mobile stations transmitting a connection request to AP1 410-1, the beacon frame transmission controller 719 may reduce the cycle on which AP1 410-1 transmits a beacon frame. When there are a relatively small number of mobile stations transmitting a connection request to AP1 410-1, the beacon frame transmission controller 719 may increase the cycle on which AP1 410-1 transmits a beacon frame.

According to various embodiments of the disclosure, a management frame and/or a beacon frame may be used by an AP to detect a connection request from a mobile station to the AP. Since AP1 410-1 needs to detect a connection request from a mobile station regardless of WLAN standards supported by the mobile station, the cycle on which AP 410-1 transmits a beacon frame may be relatively short. Since AP2 410-2 detects a connection request only from a mobile station the access of which is approved by the administrator device, a cycle on which AP2 410-2 transmits a beacon frame may be relatively long. As a frequency with which AP2 410-2 transmits a beacon frame is reduced (the cycle is increased), AP2 410-2 can use more radio resources for data communication and may thus provide high throughput for mobile stations connected to AP2 410-2 using an increased quantity of radio resources. According to one embodiment, a cycle on which a management frame and/or a beacon frame is transmitted may not exceed a threshold value, and the threshold value may vary depending on the WLAN standard. For example, the lowest rate at which a management frame and/or a beacon frame is transmitted is 6 Mbps in the IEEE 802.11g/n WLAN standards, while the lowest rate at which a management frame and/or a beacon frame is transmitted is 1 Mbps in the IEEE 802.11b WLAN standard. To exchange data with a mobile station supporting a particular version of a Wi-Fi protocol, the AP may change a cycle on which a management frame and/or a beacon frame is transmitted such that a management frame and/or a beacon frame is transmitted on a cycle corresponding to the version of the Wi-Fi protocol.

A wireless communication system according to various embodiments of the disclosure may include: a first AP configured to include a first Wi-Fi communication circuit providing a first BSS; and a second AP configured to be wirelessly connected with the first AP and to include a second Wi-Fi communication circuit providing a second BSS. The first Wi-Fi communication circuit may be configured to: wirelessly receive a first connection request from a mobile station; wirelessly exchange credential information with the mobile station; block a wireless connection with the mobile station after exchanging the credential information; and provide at least some of the credential information to the second AP. The second Wi-Fi communication circuit may be configured to: receive at least the some of the credential information from the first AP; wirelessly receive a second connection request from the mobile station; establish a wireless connection with the mobile station using at least the some of the credential information without exchanging additional credential information with the mobile station; and exchange data with the mobile station through the established wireless connection.

A wireless communication system according to various embodiments of the disclosure may include: a first AP configured to include a first Wi-Fi communication circuit configured to provide a first BSS; and a second AP configured to be wirelessly connected with the first AP and to include a second Wi-Fi communication circuit configured to provide a second BSS. The first Wi-Fi communication circuit may be configured to: wirelessly receive, from a first mobile station, a first connection request including information about a Wi-Fi protocol version of the first mobile station; wirelessly provide at least part of the information to a second mobile station; wirelessly receive an approval for a connection to the first mobile station from the second mobile station; and block a wireless connection with the first mobile station after receiving the approval. The second Wi-Fi communication circuit may be configured to: wirelessly receive the approval from a second mobile station; wirelessly receive a second connection request from the first mobile station; establish a wireless connection with the first mobile station on the basis of the approval; and exchange data with the first mobile station through the established wireless connection.

According to various embodiments of the disclosure, the first Wi-Fi communication circuit may be configured to provide the first BSS using a first frequency band, and the second Wi-Fi communication circuit may be configured to provide the second BSS using a second frequency band higher than the first frequency band.

According to various embodiments of the disclosure, the first Wi-Fi communication circuit may be configured to provide the first BSS using a first frequency band and a first MAC address, and the second Wi-Fi communication circuit may be configured to provide the second BSS using the first frequency band and a second MAC address different from the first MAC address.

According to various embodiments of the disclosure, the credential information may include at least one of a security type, a password, a cryptographic key, a key generated and encoded by an AP, a public key, or a WPS.

According to various embodiments of the disclosure, the first Wi-Fi communication circuit may transmit a first beacon frame on a first cycle, and the second Wi-Fi communication circuit may transmit a second beacon frame on a second cycle longer than the first cycle.

According to various embodiments of the disclosure, the second Wi-Fi communication circuit may provide, to the mobile station, a data packet including a frame that includes a header including information for supporting a plurality of wireless local area network (WLAN) standards and a payload carrying data.

According to various embodiments of the disclosure, the first Wi-Fi communication circuit may transmit information about the second AP to the mobile station, and the second Wi-Fi communication circuit establishes the wireless connection with the mobile station without a procedure for additionally authenticating the mobile station.

A device of an AP in a wireless communication system according to various embodiments of the disclosure may include: a communication circuit configured to wirelessly receive a connection request from a mobile station and to wirelessly exchange credential information with the mobile station; and a processor configured to block a wireless connection with the mobile station after exchanging the credential information. The processor may be configured to provide at least some of the credential information to a different AP and to control the different AP to establish a wireless connection with the mobile station without exchanging additional credential information with the mobile station.

A device of an AP in a wireless communication system according to various embodiments of the disclosure may include: a communication circuit configured to receive, from a different AP, at least some credential information exchanged between the different AP and a mobile station and to receive a connection request from the mobile station; and a processor configured to establish a wireless connection with the mobile station, in response to the connection request, using at least the some of the credential information without exchanging additional credential information with the mobile station. The communication circuit may perform a control to exchange data with the mobile station through the wireless connection.

A device of an AP in a wireless communication system according to various embodiments of the disclosure may include: a communication unit configured to wirelessly receive, from a first mobile station, a first connection request including information about a WLAN standard of the first mobile station, to wirelessly provide at least part of the information to a second mobile station, and to wirelessly receive an approval for a connection to the first mobile station from the second mobile station; and a processor configured to block a first wireless connection with the first mobile station after receiving the approval and to establish a second wireless connection between the first mobile station and a second AP.

A device of an AP in a wireless communication system according to various embodiments of the disclosure may include: a communication unit configured to wirelessly receive an approval for a connection of a first mobile station to the AP from a second mobile station and to wirelessly receive a connection request from the first mobile station; and a controller configured to establish a wireless connection with the first mobile station on the basis of the approval. The communication unit may exchange data with the mobile station through the wireless connection, and the approval may be determined on the basis of information about a WLAN standard of the first mobile station.

Figure 8:
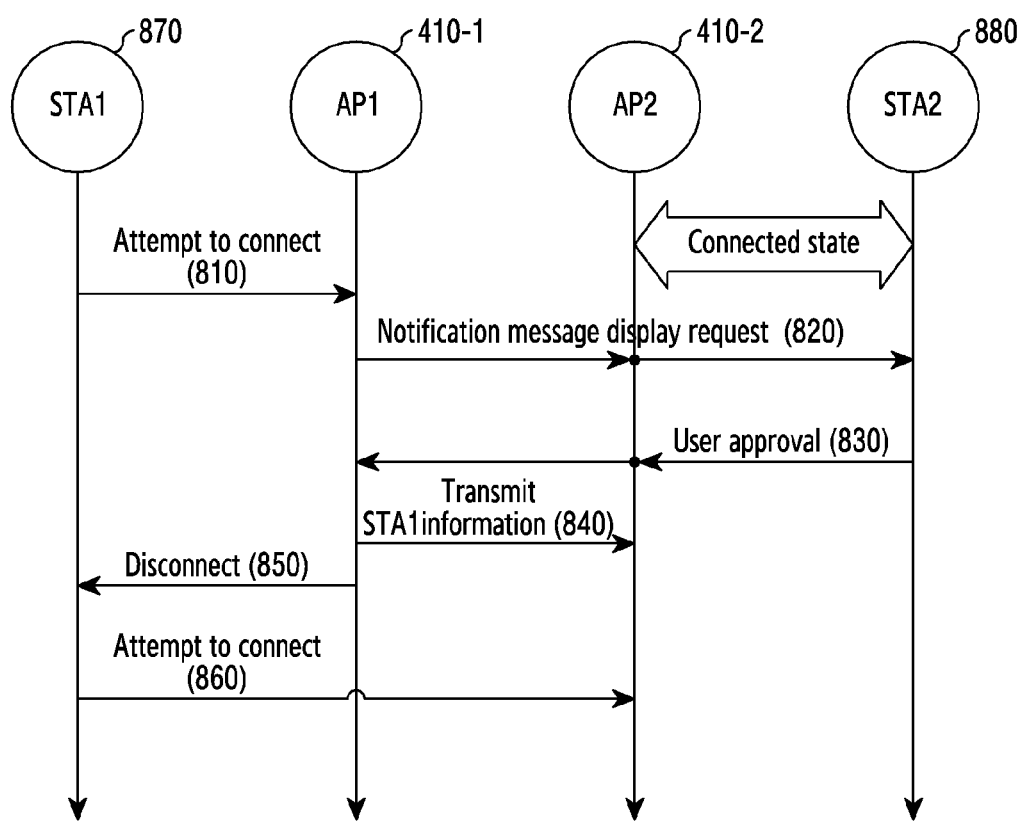
FIG. 8 is a signal flowchart showing that a mobile station is connected to a data-communication AP according to various embodiments of the disclosure.

FIG. 8 is a signal flowchart showing that a mobile station is connected to a data-communication AP according to various embodiments of the disclosure. In FIG. 8, AP1 410-1 (e.g., the AP 410 of FIG. 7) and AP2 410-2 (e.g. the AP 410 of FIG. 7) may be a gatekeeper AP and a data-communication AP, respectively; STA1 (station 1) 870 (e.g., the electronic device 101 of FIG. 1 or the electronic device 201 of FIG. 2) may be a mobile station attempting to access AP2 410-2; and STA2 880 (e.g., the electronic device 101 of FIG. 1 or the electronic device 201 of FIG. 2) may be a mobile station connected to AP2 410-2 and an administrator device.

In operation 810, STA1 870 may attempt to connect to AP1 410-1. An operation of STA1 870 attempting to connect to AP1 410-1 may include an operation of STA1 870 transmitting a connection request to AP1 410-1 and an operation of STA 870 exchanging credential information with AP1 410-1. The connection request transmitted by STA1 870 to AP1 410-1 may include information about a WLAN standard that STA1 870 can support.

In operation 820, AP1 410-1 may transmit a request to display a notification message to STA2 880 via AP2 410-2. For example, the request to display the notification message may include information indicating that STA1 870 attempts to access AP2 410-2 and the information about the WLAN standard that STA1 870 can support. Although not shown, upon receiving the request to display the notification message from AP1 410-1, STA2 880 may display a message indicating that STA1 870 attempts to access AP2 410-2. For example, the message may include information about a WLAN standard of a mobile station that attempts to connect, information indicating that a low-speed device attempts to connect, or a UI for receiving an input about whether to allow access. STA2 880 may determine whether to allow access of STA1 870 to AP2 410-2.

According to one embodiment, when STA2 880 permits STA1 870 to access AP2 410-2, STA2 880 may transmit an access approval message to API 410-1 via AP2 410-2 in operation 830. Upon receiving the access approval message, API 410-1 may transmit information about STA1 870 to AP2 410-2 in operation 840. For example, the information about STA1 870 may include the MAC address of STA1 870 or credential information. Upon receiving the information about STA1 870, AP2 410-2 may identify the MAC address of STA1 870 and may perform operations for establishing a connection with STA1 870. Although not shown, in operation 840, API 410-1 may provide the credential information to AP2 410-2. The credential information provided to AP2 410-2 may include at least some of the credential information exchanged between STA1 870 and API 410-1 in operation 810. AP2 410-2 may establish a wireless connection with STA1 860-1 using the exchanged credential information without further exchanging credential information with STA1 870.

In operation 850, API 410-1 may release a connection with STA1 870. For example, API 410-1 may register STA1 870 in a blacklist of API 410-1 in order to be disconnected from STA1 870. API 410-1 may request AP2 410-2 to register STA1 870 in a whitelist of AP2 410-2. The ID of a mobile station not allowed to access a particular AP or a BSS managed by the AP may be registered in the blacklist. Each ID may be assigned an index. The ID of a mobile station allowed to access a particular AP or a BSS managed by the AP may be registered in the whitelist. Each ID may be assigned an index. For example, as illustrated in FIG. 9, the IDs of registered mobile stations and corresponding indexes may be managed in a table in a blacklist 910 and a whitelist 930.

According to various embodiments of the disclosure, a blacklist and a whitelist may be used to reject or allow access of a mobile station to a BSS managed by an AP that stores the blacklist and the whitelist. The blacklist and the whitelist may be used to reject or allow access of a mobile station to a BSS managed by an AP other than the BSS managed by the AP that stores the blacklist and the whitelist. For example, the AP that stores the blacklist and the whitelist may exchange information about a blacklist and a whitelist with a different AP over a wireless or wired connection, thereby controlling access of a mobile station to a BSS managed by the different AP. For example, the blacklist of AP1 410-1 and the whitelist of AP2 410-2 may be separately managed by API 410-1 and AP2 410-2, respectively. In this case, API 410-1 may register STA1 870 in the blacklist of API 410-1 upon receiving the access approval message, and AP2 410-2 may register STA1 870 in the whitelist of AP2 410-2 upon receiving the access approval message. When STA1 870 is registered in the blacklist of API 410-1, STA1 870 may be disconnected from API 410-1.

In operation 860, STA1 870 may attempt to connect to AP 410-2. AP2 410-2 may receive a connection request from STA1 870, may identify that STA1 870 is registered in the whitelist of AP2 410-2, and may then establish a wireless connection with STA1 870 in response to the connection request.

Subsequently, STA1 870 and AP2 410-2 may exchange data through the established wireless connection.

Figure 10A:
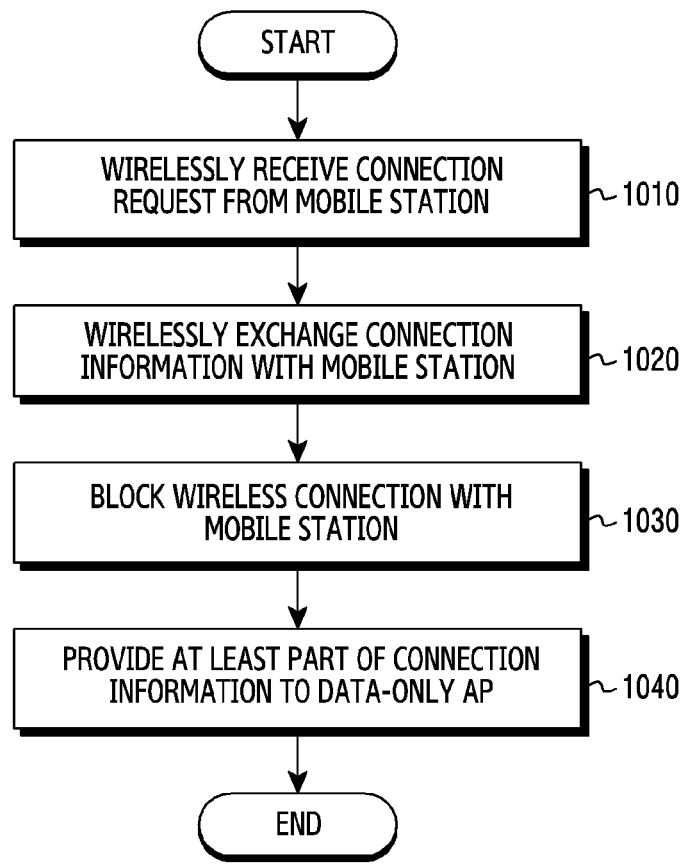
FIG. 10A is a flowchart illustrating the operation of a gatekeeper AP for exchanging credential information between APs according to various embodiments of the disclosure.

FIG. 10A is a flowchart illustrating the operation of a gatekeeper AP for exchanging credential information between APs according to various embodiments of the disclosure.

Referring to FIG. 10A, in operation 1010, the gatekeeper AP (e.g., the AP 410 of FIG. 7 or API 410-1 of FIG. 8) may receive a connection request from a mobile station. A processor 710 of the gatekeeper AP may control a communication unit 740 to wirelessly receive the connection request from the mobile station. The connection request may include information about a WLAN standard that the mobile station can support.

In operation 1020, the gatekeeper AP may exchange credential information with the mobile station. The processor 710 of the gatekeeper AP may control the communication unit 740 to wirelessly exchange the credential information with the mobile station. The operation of exchanging credential information between the mobile station and the AP may include an operation in which both the AP and the mobile station perform corresponding agreed operations. When the credential information is exchanged between the mobile station and the AP, a connection may be established between the mobile station and the AP, and the mobile station and the AP may store at least part of the exchanged credential information.

In operation 1030, the gatekeeper AP may block a wireless connection to the mobile station. The processor 710 of the gatekeeper AP may block the wireless connection to the mobile station. For example, the gatekeeper AP may register the mobile station in a blacklist of the gatekeeper AP, thereby blocking the wireless connection to the mobile station.

In operation 1040, the gatekeeper AP may provide at least some of the credential information to a data-communication AP. The processor 710 of the gatekeeper AP may control the communication unit 740 to provide at least the some of the credential information to the data-communication AP. For example, the gatekeeper AP may provide the data-communication AP with at least one of a network security type provided by the gatekeeper AP, an SSID, a password for a mobile station to access the AP, a cryptographic key, a key generated by the gatekeeper AP, a public key, or an authentication message generated by a user input (e.g., WPS or a PIN). Since the mobile station, the gatekeeper AP, and the data-communication AP have at least some of the same credential information through the exchange of the credential information, the data-communication AP may establish a connection with the mobile station using at least the some of the credential information provided from the gatekeeper AP without additionally exchanging the credential information with the mobile station.

Through the exchange of the credit information, theFIG. 10B is a flowchart illustrating the operation of a data-communication AP for exchanging credential information between APs according to various embodiments of the disclosure.

Figure 10B:
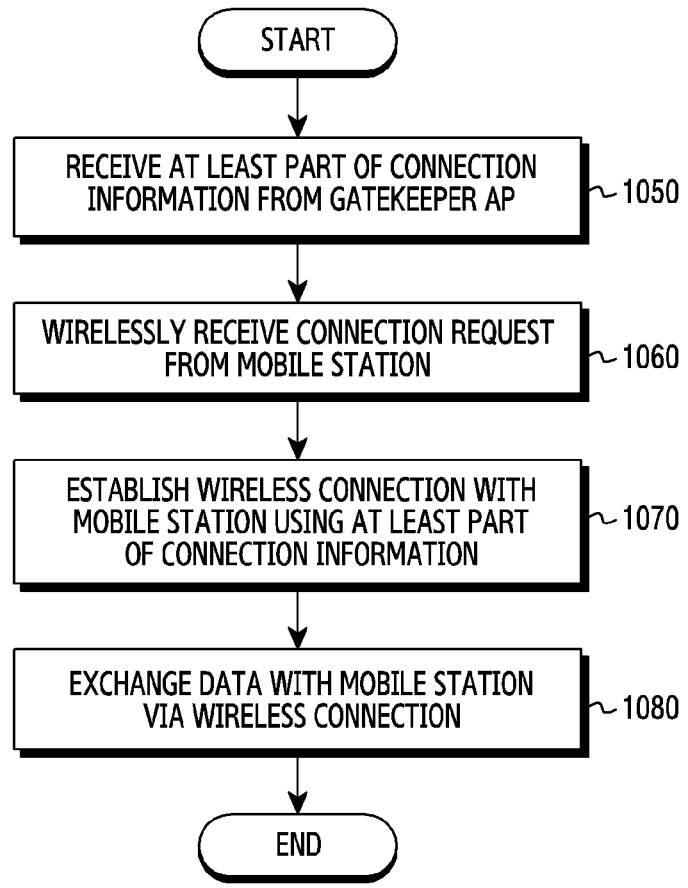
FIG. 10B is a flowchart illustrating the operation of a data-communication AP for exchanging credential information between APs according to various embodiments of the disclosure.

Referring to FIG. 10B, in operation 1050, the data-communication AP (e.g., the AP 410 of FIG. 7 or AP2 410-2 of FIG. 8) may receive at least some credential information from a gatekeeper AP. A processor 710 of the data-communication AP may control a communication unit 740 to receive at least the some of the credential information from the gatekeeper AP. The credential information received from the gatekeeper AP may be credential information that the gatekeeper AP exchanges with a mobile station to establish a connection with the mobile station.

In operation 1060, the data-communication AP may establish a wireless connection with the mobile station using at least the some of the credential information. The processor 710 of the data-communication AP may establish the wireless connection with the mobile station using at least the some of the credential information. Since the mobile station, the gatekeeper AP, and the data-communication AP have at least some of the same credential information through the exchange of the credential information in operation 1040 of FIG. 10A, the data-communication AP may establish a connection with the mobile station using at least the some of the credential information provided from the gatekeeper AP without additionally exchanging the credential information with the mobile station.

In operation 1080, the data-communication AP may exchange data with the mobile station via the wireless connection. The processor 710 of the data-communication AP may control the communication unit 740 to exchange the data with the mobile station via the wireless connection.

An operating method of an AP in a wireless communication system according to various embodiments of the disclosure may include: receiving at least some credential information from a first AP; receiving a connection request from a mobile station; establishing a wireless connection with the mobile station using at least the some of the credential information without exchanging additional credential information with the mobile station in response to the connection request; and exchanging data with the mobile station through the wireless connection. The credential information may be information exchanged between the first AP and the mobile station.

Figure 11A:
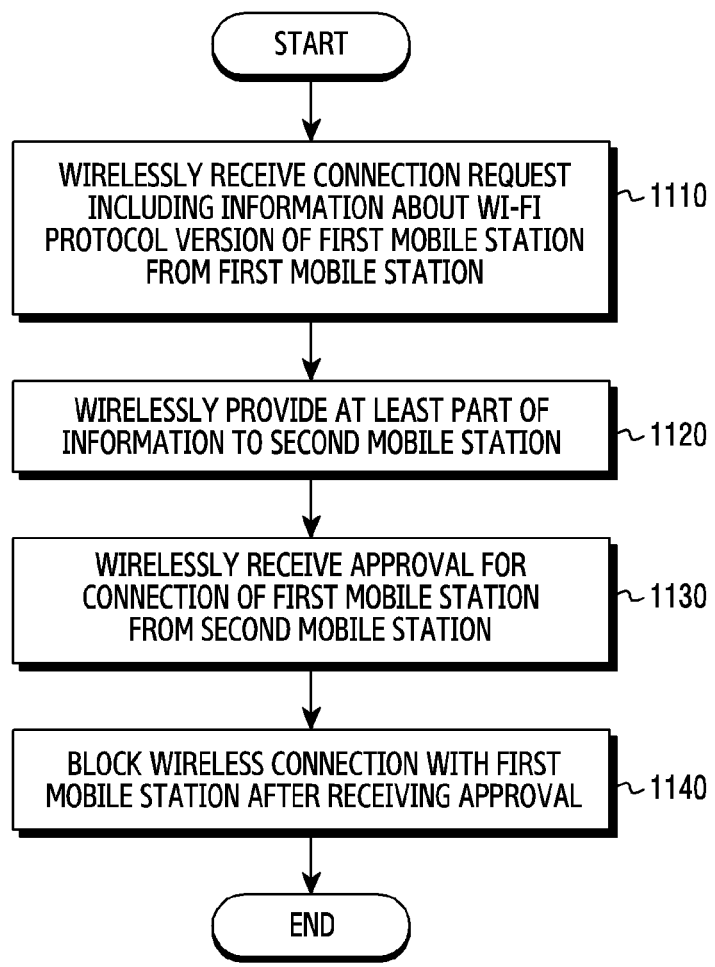
FIG. 11A is a flowchart illustrating the operation of a gatekeeper AP for providing a connection to a mobile station according to various embodiments of the disclosure.

FIG. 11A is a flowchart illustrating the operation of a gatekeeper AP for providing a connection for a mobile station according to various embodiments of the disclosure.

Referring to FIG. 11A, in operation 1110, the gatekeeper AP (e.g., the AP 410 of FIG. 7 or AP1 410-1 of FIG. 8) may wirelessly receive a connection request including information about a WLAN standard of a first mobile station from the first mobile station. A processor 710 of the gatekeeper AP may control a communication unit 740 to wirelessly receive the connection request including the information about the WLAN standard of the first mobile station from the first mobile station.

In operation 1120, the gatekeeper AP may wirelessly provide at least part of the information to a second mobile station. The processor 710 of the gatekeeper AP may control the communication unit 740 to wirelessly provide at least the part of the information to the second mobile station. The information provided by the communication unit 740 to the second mobile station may include information indicating that the first mobile station attempts to access a data-communication AP or information about a WLAN standard that the mobile station can support.

In operation 1130, the gatekeeper AP may wirelessly receive an approval for a connection of the first mobile station from the second mobile station. The processor 710 of the gatekeeper AP may control the communication unit 740 to wirelessly receive the approval for the connection of the first mobile station from the second mobile station.

In operation 1140, the gatekeeper AP may block a wireless connection with the first mobile station. The processor 710 of the gatekeeper AP may perform a control to block the wireless connection with the first mobile station. The gatekeeper AP may block the wireless connection with the first mobile station, thus establishing a wireless connection between the first mobile station and the data-communication AP. To block the connection with the first mobile station, the gatekeeper AP may register the first mobile station in a blacklist of the gatekeeper AP and in a whitelist of the data-communication AP. To establish a wireless connection between the first mobile station and the data-communication AP, the gatekeeper AP may provide information about the approval received from the second mobile station in operation 1130 to the data-communication AP. The information about the approval may include, for example, credential information exchanged between the gatekeeper AP and the first mobile station and information about the first mobile station (e.g., the MAC address of the first mobile station). For example, upon receiving the information about the approval, the data-communication AP may identify the MAC address of the first mobile station and may establish a wireless connection with the first mobile station using the credential information exchanged between the gatekeeper AP and the first mobile station without exchanging additional credential information with the first mobile station.

Figure 11B:
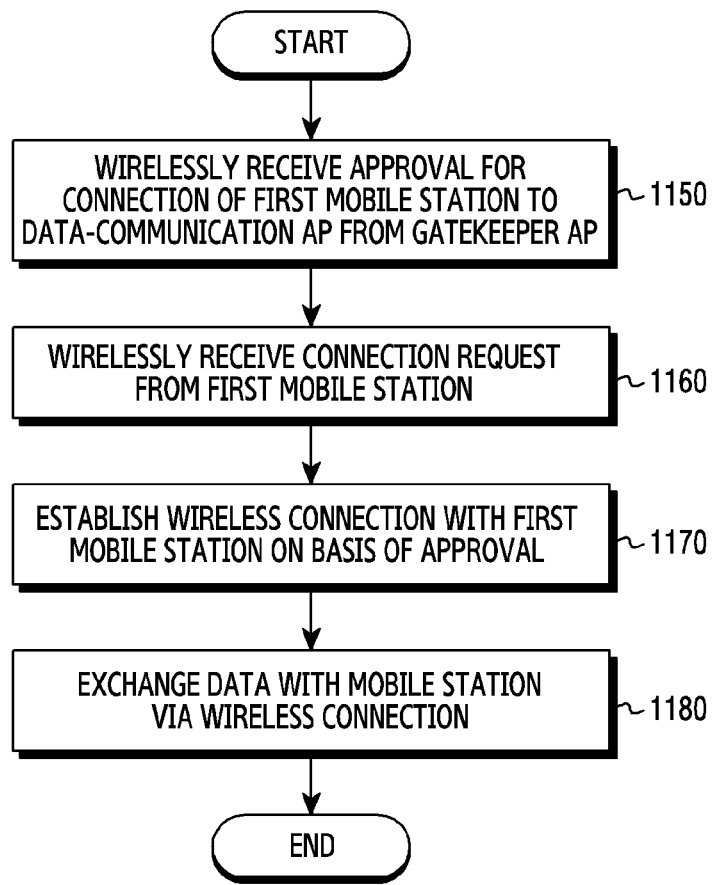
FIG. 11B is a flowchart illustrating the operation of a data-communication AP for providing a connection for a mobile station depending on a user approval according to various embodiments of the disclosure.

FIG. 11B is a flowchart illustrating the operation of a data-communication AP for providing a connection for a mobile station according to various embodiments of the disclosure.

Referring to FIG. 11B, in operation 1150, the data-communication AP (e.g., AP2 410-2) may wirelessly receive an approval for a connection of a first mobile station to the data-communication AP from a gatekeeper AP (e.g., AP1 410-1). A processor 710 of the data-communication AP may control a communication unit 740 to wirelessly receive the approval for the connection of the first mobile station to the data-communication AP from the gatekeeper AP. After receiving an access approval message, the processor 710 of the data-communication AP may register the first mobile station that attempts to connect in a whitelist of the data-communication AP.

In operation 1160, the data-communication AP may wirelessly receive a connection request from the first mobile station. The processor 710 of the data-communication AP may control the communication unit 740 to wirelessly receive the connection request from the first mobile station. The processor 710 of the data-communication AP may control the communication unit 740 to detect the connection request from the first mobile station.

In operation 1170, since the first mobile station is registered in the whitelist of the data-communication AP, the data-communication AP may establish a wireless connection with the first mobile station on the basis of the approval. The processor 710 of the data-communication AP may perform a control to establish the wireless connection with the first mobile station on the basis of the approval. The processor 710 of the data-communication AP may establish the connection with the first mobile station in response to the connection request detected in operation 1160.

In operation 1180, the data-communication AP may exchange data with the first mobile station via the wireless connection. The processor 710 of the data-communication AP may control the communication unit 740 to exchange the data with the first mobile station through the wireless connection.

An operating method of an AP in a wireless communication system according to various embodiments of the disclosure may include: receiving a first message including information about a WLAN standard of a first mobile station from the first mobile station; transmitting a second message requesting an approval for a connection of the first mobile station to a second mobile station; receiving a third message indicating the approval for the connection of the first mobile station from the second mobile station; and controlling a wireless connection to be established between the first mobile station and another AP.

Figure 12:
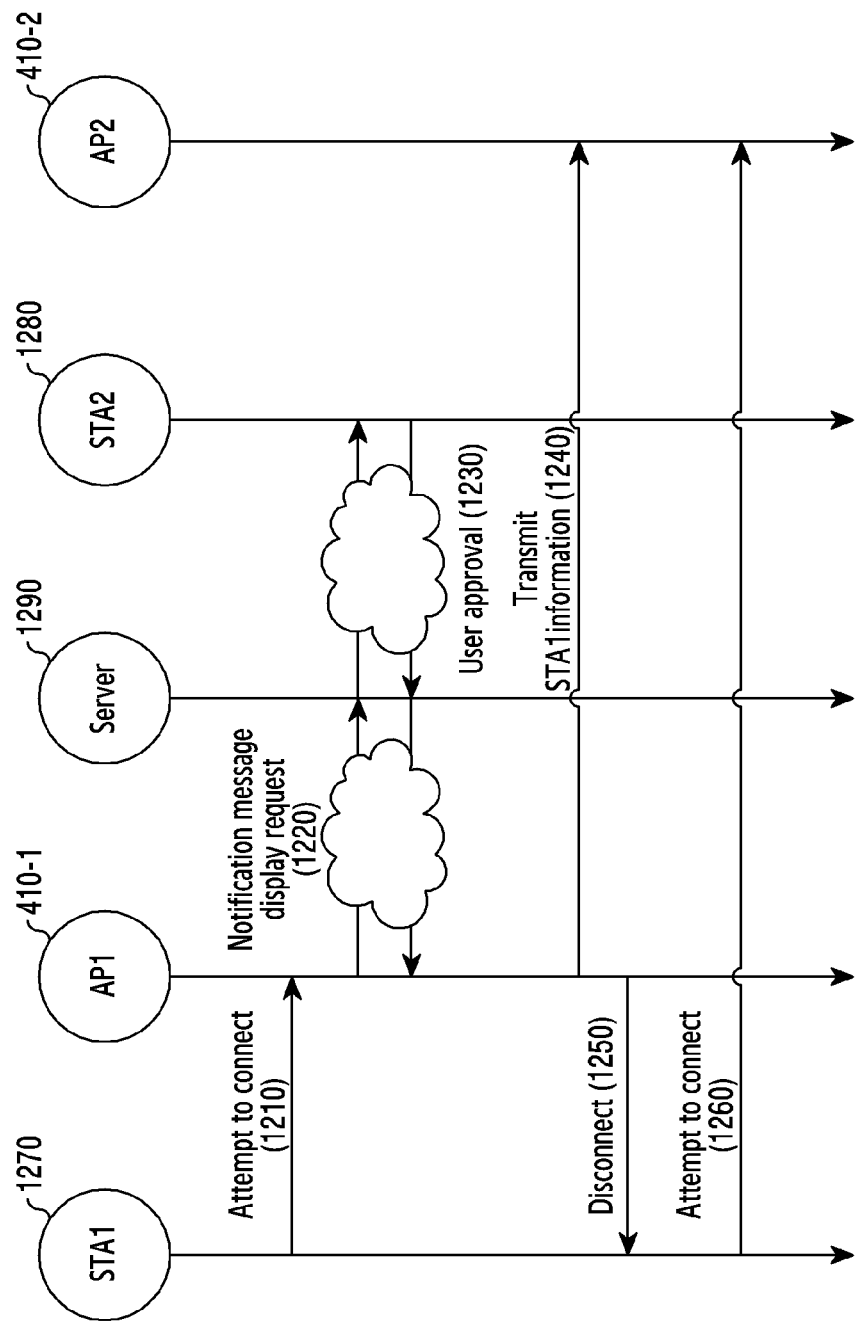
FIG. 12 is a signal flowchart showing that a mobile station is connected to a data-communication AP via a server according to various embodiments of the disclosure.

FIG. 12 is a signal flowchart showing that a mobile station is connected to a data-communication AP via a server according to various embodiments of the disclosure. In FIG. 12, AP1 410-1 (e.g., the AP 410 of FIG. 7 or AP1 410-1 in FIG. 8) and AP2 410-2 ((e.g., the AP 410 of FIG. 7 or AP2 410-2 in FIG. 8) may be a gatekeeper AP and a data-communication AP, respectively; STA1 1270 (e.g., the electronic device 101 of FIG. 1, the electronic device 201 of FIG. 2, or STA1 870 of FIG. 8) may be a mobile station attempting to access AP2 410-2; and STA2 1280 (e.g., the electronic device 101 of FIG. 1, the electronic device 201 of FIG. 2, or STA2 880 of FIG. 8) may be a mobile station connected to AP2 410-2 and an administrator device. Operations 1210, 1240, 1250, and 1260 in FIG. 12 may be equivalent or similar to operations 810, 840, 850, and 860 in FIG. 8, respectively.

According to one embodiment, when STA2 1280 is not connected to AP2 410-2, AP1 410-1 may transmit a notification message display request to STA2 1280 via a server 1290 in operation 1220. API 410-1 may receive an access approval message from STA2 1280 via the server 1290.

Figure 13:
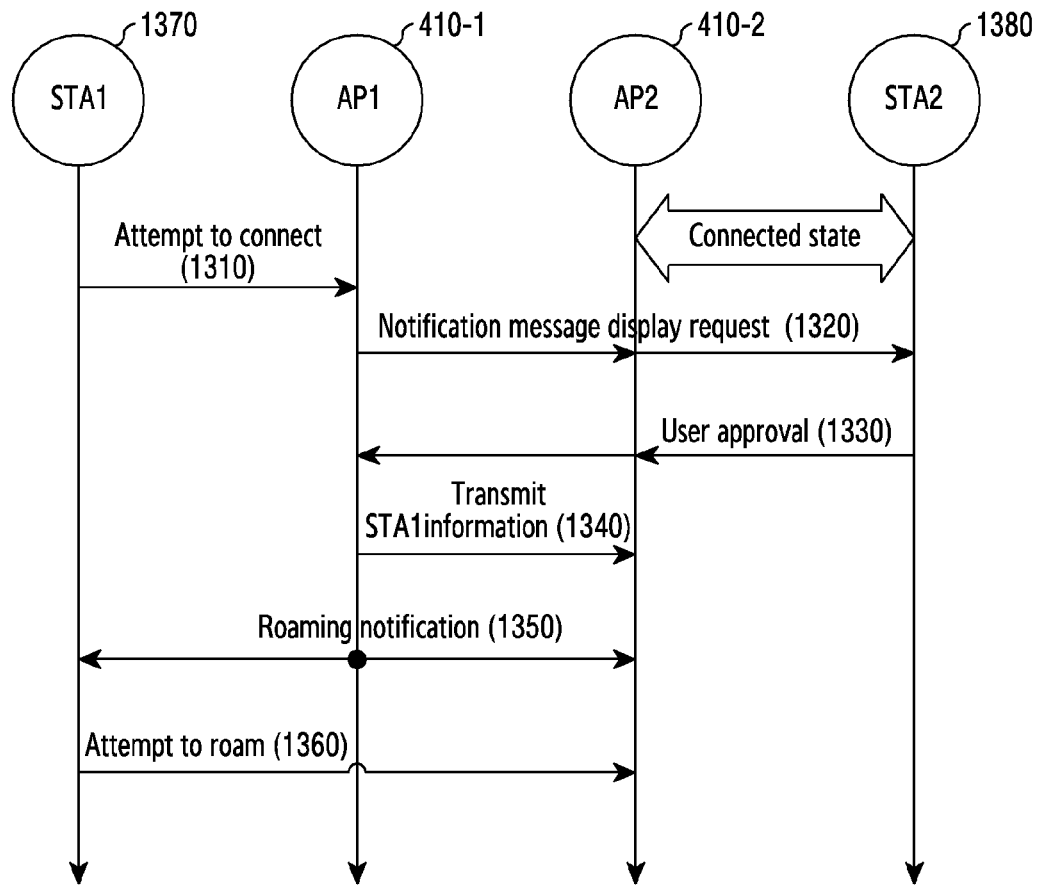
FIG. 13 is a signal flowchart showing that a mobile station is connected to a data-communication AP using roaming according to various embodiments of the disclosure.

FIG. 13 is a signal flowchart showing that a mobile station is connected to a data-communication AP using roaming according to various embodiments of the disclosure. In FIG. 13, AP1 410-1 (e.g., the AP 410 of FIG. 7 or AP1 410-1 in FIG. 8) and AP2 410-2 ((e.g., the AP 410 of FIG. 7 or AP2 410-2 in FIG. 8) may be a gatekeeper AP and a data-communication AP, respectively; STA1 1370 (e.g., the electronic device 101 of FIG. 1, the electronic device 201 of FIG. 2, or STA1 870 of FIG. 8) may be a mobile station attempting to access AP2 410-2; and STA2 1380 (e.g., the electronic device 101 of FIG. 1, the electronic device 201 of FIG. 2, or STA2 880 of FIG. 8) may be a mobile station connected to AP2 410-2 and an administrator device. Operations 1310, 1320, 1330, and 1340 in FIG. 13 may be equivalent or similar to operations 810, 820, 830, and 840 in FIG. 8, respectively.

In operation 1350, API 410-1 may transmit a roaming notification to STA1 1370 and AP2 410-2. For example, the roaming notification is for STA1 1370 to perform seamless disconnection from API 410-1 and to establish seamless connection to AP2 410-2, and the roaming notification transmitted to STA1 1370 may include ID information of AP2 410-2.

In operation 1360, STA1 1370 may attempt to roam to AP2 410-2. For example, STA1 1370 may try to roam using the ID information of AP2 410-2. STA1 1370 may be connected to AP2 410-2 without any additional authentication procedure with AP2 410-2.

Figure 14:
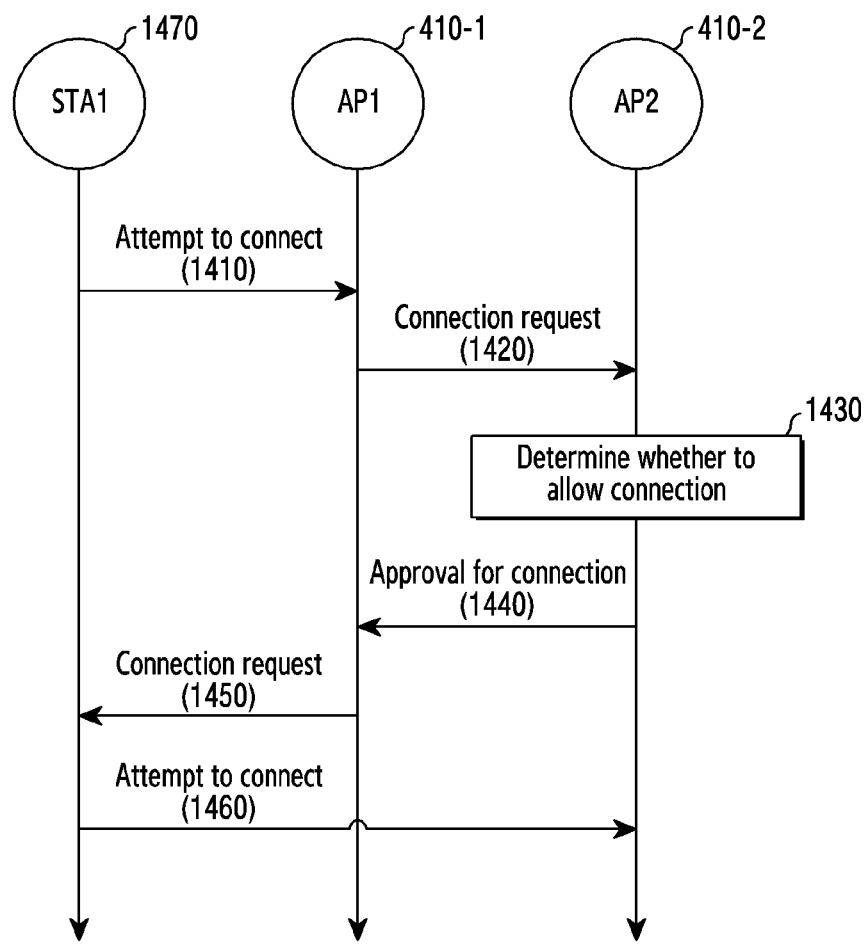
FIG. 14 is a signal flowchart showing that a data-communication AP determines whether to connect to a mobile station according to various embodiments of the disclosure.

FIG. 14 is a signal flowchart showing that a data-communication AP determines whether to connect a mobile station according to various embodiments of the disclosure. In FIG. 14, AP1 410-1 (e.g., the AP 410 of FIG. 7 or API 410-1 in FIG. 8) and AP2 410-2 ((e.g., the AP 410 of FIG. 7 or AP2 410-2 in FIG. 8) may be a gatekeeper AP and a data-communication AP, respectively; and STA1 1470 (e.g., the electronic device 101 of FIG. 1, the electronic device 201 of FIG. 2, or STA1 870 of FIG. 8) may be a mobile station attempting to access AP2 410-2.

According to various embodiments of the disclosure, AP2 410-2 may independently determine whether to allow access of STA1 1470 to AP2 410-2. For example, when a WLAN standard that can be supported by STA1 1470 attempting to access AP2 410-2 belongs to a specified condition on the basis of information received from API 410-1, AP2 410-2 may allow STA1 1470 to access AP2 410-2 without displaying a notification message for a user. When the WLAN standard that can be supported by STA1 1470 attempting to access AP2 410-2 does not belong to the specified condition, if there is no device that is currently connected to AP2 410-2 and belongs to the specified condition, if there are a small number of connected devices belonging to the specified condition and thus throughput loss of a device belonging to the specified condition is relatively inconsiderable even though a device not belonging to the specification condition is connected, or if mobile stations currently connected to AP2 410-2 operate in a sleep mode or require a low QoS level, AP2 410-2 may allow STA1 1470 attempting to connect to access AP2 410-2.

In operation 1420, AP1 410-1 may directly transmit a connection request message to AP2 410-2. The connection request message transmitted by API 410-1 may include information indicating that STA1 1470 attempts to access AP2 410-2 or information about a WLAN standard that STA1 1470 can support.

In operation 1430, AP2 410-2 may determine whether to allow STA1 1470 to access AP2 410-2. According to one embodiment, when AP2 410-2 includes a display, AP2 410-2 may display a message indicating that STA1 1470 attempts to connect through the display. For example, the message that AP2 410-2 displays on the display may include a UI for receiving an input about whether to allow access. AP2 410-2 may receive an input about whether to allow access through the UI and may determine whether to allow STA1 1470 to access AP2 410-2. In another example, AP2 410-2 may independently determine whether to allow STA1 1470 to access AP2 410-2 without receiving any input. Specifically, when the WLAN standard that can be supported by STA1 1470 attempting to access AP2 410-2 belongs to the specified condition on the basis of the information received from API 410-1, AP2 410-2 may autonomously allow STA1 1470 to access AP2 410-2 without displaying a notification message for a user. When the WLAN standard that can be supported by STA1 1470 attempting to access AP2 410-2 belongs to the specified condition, if there is no device (e.g., a high-speed device) that is currently connected to AP2 410-2 and belongs to the specified condition, if there are a small number of connected high-speed devices and thus throughput loss of a device belonging to the specified condition is relatively inconsiderable even though a device (e.g., a low-speed device) not belonging to the specification condition is connected, or if mobile stations currently connected to AP2 410-2 operate in a sleep mode or require a low QoS level, AP2 410-2 may allow STA1 1470 attempting to connect to access AP2 410-2.

When AP2 410-2 determines to allow access of STA1 1470 in operation 1430, AP2 410-2 may transmit an access approval message to API 410-1 in operation 1440. Upon receiving the access approval message, API 410-1 may register STA1 1470 in a blacklist of API 410-1 and may request AP2 410-2 to register STA1 1470 in a whitelist of AP2 410-2. STA1 1470 may be connected to AP2 410-2 from AP1 410-1.

Figure 15:
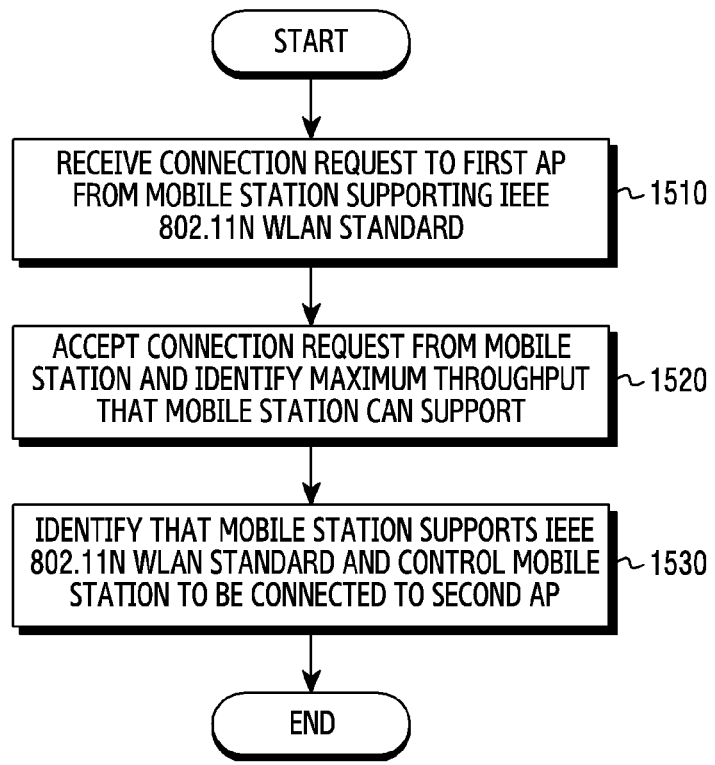
FIG. 15 is a flowchart illustrating the operation of a gatekeeper AP where a mobile station supporting a WLAN standard of IEEE 802.11n attempts a connection to a data-communication AP according to various embodiments of the disclosure.

FIG. 15 is a flowchart illustrating the operation of a gatekeeper AP where a mobile station supporting a WLAN standard of IEEE 802.11n attempts a connection to a data-communication AP according to various embodiments of the disclosure.

In operation 1510, a processor of a first AP (e.g., the AP 410 of FIG. 7 or API 410-1 of FIG. 8) may receive a connection request to the first AP from a mobile station (e.g., the electronic device 101 of FIG. 1, the electronic device 201 of FIG. 2, or STA1 870 of FIG. 8) supporting a WLAN standard of IEEE 802.11n. For example, the first AP may operate as a gatekeeper AP and can support IEEE 802.11b/g/n WLAN standards. The connection request may include information about a WLAN standard (e.g., IEEE 802.11n) that the mobile station can support.

In operation 1520, the processor of the first AP (e.g., the gatekeeper AP) may accept the connection request from the mobile station and may identify the maximum throughput that the mobile station can support. For example, the processor of the first AP may identify the WLAN standard that the mobile station can support from the information included in the connection request from the mobile station and accordingly may identify the maximum throughput that the mobile station can support.

In operation 1530, the processor of the first AP may identify that the mobile station supports the IEEE 802.11n WLAN standard and may then control the mobile station to be connected to a second AP (e.g., a data-communication AP). For example, the second AP (e.g., the AP 410 of FIG. 7 or AP2 410-2 of FIG. 8) may operate as a data-communication AP and may be activated to support the IEEE 802.11n WLAN standard. Since the second AP is a data-communication AP and does not directly receive a connection request from any mobile station, a cycle on which the second AP transmits a management frame and/or a beacon frame may be set to be shorter than that of the first AP. Since the mobile station attempting to connect to the second AP supports the IEEE 802.11n WLAN standard activated by the second AP, the second AP may establish a connection with the mobile station without changing a configuration to support a different version of the Wi-Fi protocols. To establish a connection between the second AP and the mobile station, the mobile station may be registered in a blacklist of the first AP and in a whitelist of the second AP. When the mobile station supports IEEE 802.11k/r/v Wi-Fi protocols, the mobile station may perform disconnection and may establish a connection in a seamless manner through roaming from the first AP to the second AP without performing any additional authentication procedure.

According to various embodiments of the disclosure, a gatekeeper AP and a data-communication AP may use the same credential information and the same frequency band. In order that the gatekeeper AP and the data-communication AP use the same credential information, one of the gatekeeper AP and the data-communication AP may provide credential information about a mobile station to the other AP. The mobile station may recognize networks respectively provided by the APs using the same credential information and the same frequency band as the same network. When performing disconnection and establishing a connection with respect to the APs, the mobile station may be connected to a target AP without exchanging additional credential information with the target AP. However, it is shown as an example that the gatekeeper AP and the data-communication AP use the same credential information and the same frequency band, and the gatekeeper AP and the data-communication AP may use different credential information and frequency bands. For example, the data-communication AP may provide a BSS using a higher frequency band than that of the gatekeeper AP and may exchange additional credential information to establish a new connection with a mobile station.

Figure 16:
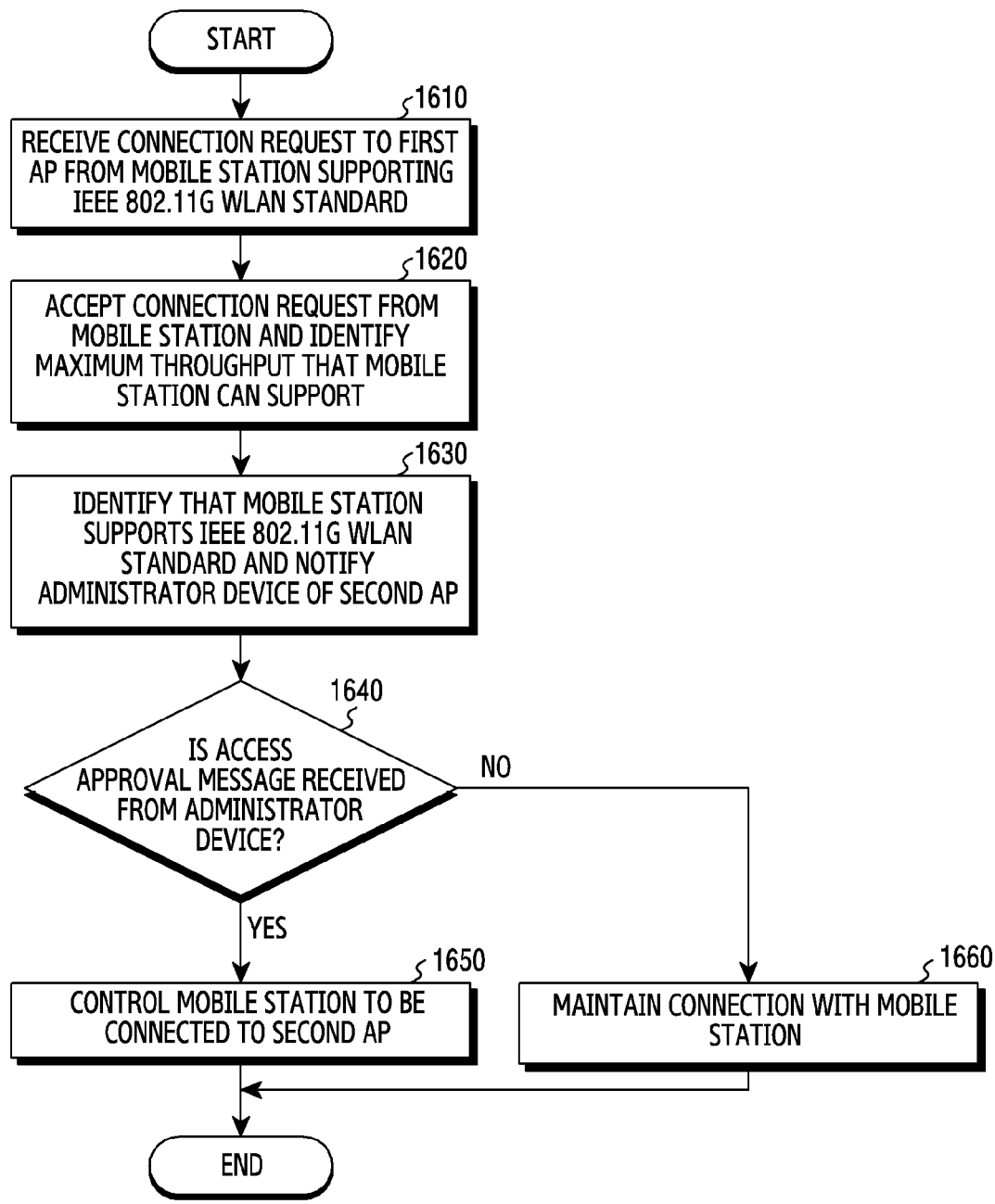
FIG. 16 is a flowchart illustrating the operation of a gatekeeper AP where a mobile station supporting a WLAN standard of IEEE 802.11g attempts a connection to a data-communication AP according to various embodiments of the disclosure.

FIG. 16 is a flowchart illustrating the operation of a gatekeeper AP where a mobile station supporting a WLAN standard of IEEE 802.11g attempts a connection to a data-communication AP according to various embodiments of the disclosure.

In operation 1610, a processor of a first AP (e.g., the AP 410 of FIG. 7 or AP1 410-1 of FIG. 8) may receive a connection request to the first AP from a mobile station (e.g., the electronic device 101 of FIG. 1, the electronic device 201 of FIG. 2, or STA1 870 of FIG. 8) supporting a WLAN standard of IEEE 802.11g. For example, the first AP may operate as a gatekeeper AP and can support IEEE 802.11b/g/n WLAN standards. The second AP (e.g., the AP 410 of FIG. 7 or AP2 410-2 of FIG. 8) may operate as a data-communication AP and may be activated to support the IEEE 802.11n WLAN standard. A cycle on which the second AP transmits a management frame and/or a beacon frame may be set to be shorter than that of the first AP. The connection request may include, for example, information about a WLAN standard that the mobile station can support.

In operation 1620, the processor of the first AP may accept the connection request from the mobile station and may identify the maximum throughput that the mobile station can support. For example, the processor of the first AP may identify the WLAN standard that the mobile station can support from the information included in the connection request from the mobile station and accordingly may identify the maximum throughput that the mobile station can support.

In operation 1630, the processor of the first AP may identify that the mobile station supports the IEEE 802.11g WLAN standard and may then notify an administrator device of the second AP that a mobile station supporting a WLAN standard not belonging to a specified condition attempts to access the second AP. The processor of the first AP may have information about the WLAN standard activated by the second AP and may compare the WLAN standard activated by the second AP with the WLAN standard that the mobile station can support. Although not shown, the administrator device may display a message on a display in response to a notification of an attempt of the mobile station to connect. The message may include information about the WLAN standard of the mobile station that attempts to connect, information indicating that a device not belonging to the specified condition (e.g., a low-speed device) attempts to connect, or a UI for receiving an input about whether to allow access.

In operation 1640, the processor of the first AP may determine whether an access approval message is received from the administrator device. For example, the administrator device (e.g., the electronic device 101 of FIG. 1, the electronic device 201 of FIG. 2, or STA2 880 of FIG. 8) may receive an input to determine whether to allow the access from a user or may autonomously determine whether to allow the access. The administrator device may transmit an access approval message to the first AP corresponding to an approval for the access of the mobile station to the second AP, and the first AP may receive the access approval message from the administrator device.

When the access approval message is received from the administrator device, the processor of the first AP may control the mobile station to be connected to the second AP in operation 1650. To establish a connection between the second AP and the mobile station, the first AP may register the mobile station in a blacklist of the first AP and in a whitelist of the second AP. Further, to establish the connection between the second AP and the mobile station, the first AP may request the second AP to change a configuration so as to support the IEEE 802.11g WLAN standard. For example, in response to a request from the first AP, the second AP, in which only the IEEE 802.11n WLAN standard is activated, may activate up to the IEEE 802.11g WLAN standard in order to exchange data with the mobile station. When the mobile station supports IEEE 802.11k/r/v Wi-Fi protocols, the mobile station may establish a connection and may perform disconnection in a seamless manner through roaming from the first AP to the second AP without performing any additional authentication procedure.

When no access approval message is received from the administrator device, the first AP may maintain a connection with the mobile station in operation 1660.

According to various embodiments of the disclosure, a data-communication AP may exchange data with mobile stations included in a BSS thereof. Since the mobile stations included in the BBS may support different WLAN standards, a frame of a data packet transmitted by the data-communication AP may include a header for a plurality of WLAN standards so that the data-communication AP exchanges data even with a mobile station supporting a lower-version WLAN standard. For example, even when the data-communication AP supports IEEE 802.11ac, a frame of a data packet transmitted by the data-communication AP may include a header for all WLAN standards (IEEE 802.11a/b/g/n/ac/ad) and a payload in order to support backward compatibility with a lower version.

According to various embodiments of the disclosure, when a data-communication AP is activated to support only the IEEE 802.11n WLAN standard, a frame of a data packet transmitted by the data-communication AP may include only a header for the IEEE 802.11n WLAN standard (green field mode). According to one embodiment, when the data-only AP, in which only the IEEE 802.11n WLAN standard is activated, activates up to the IEEE 802.11g WLAN standard, the data-communication AP may release the green field mode and may include a header for a plurality of WLAN standards including IEEE 802.11g in a frame of a transmitted data packet.

Figure 17:
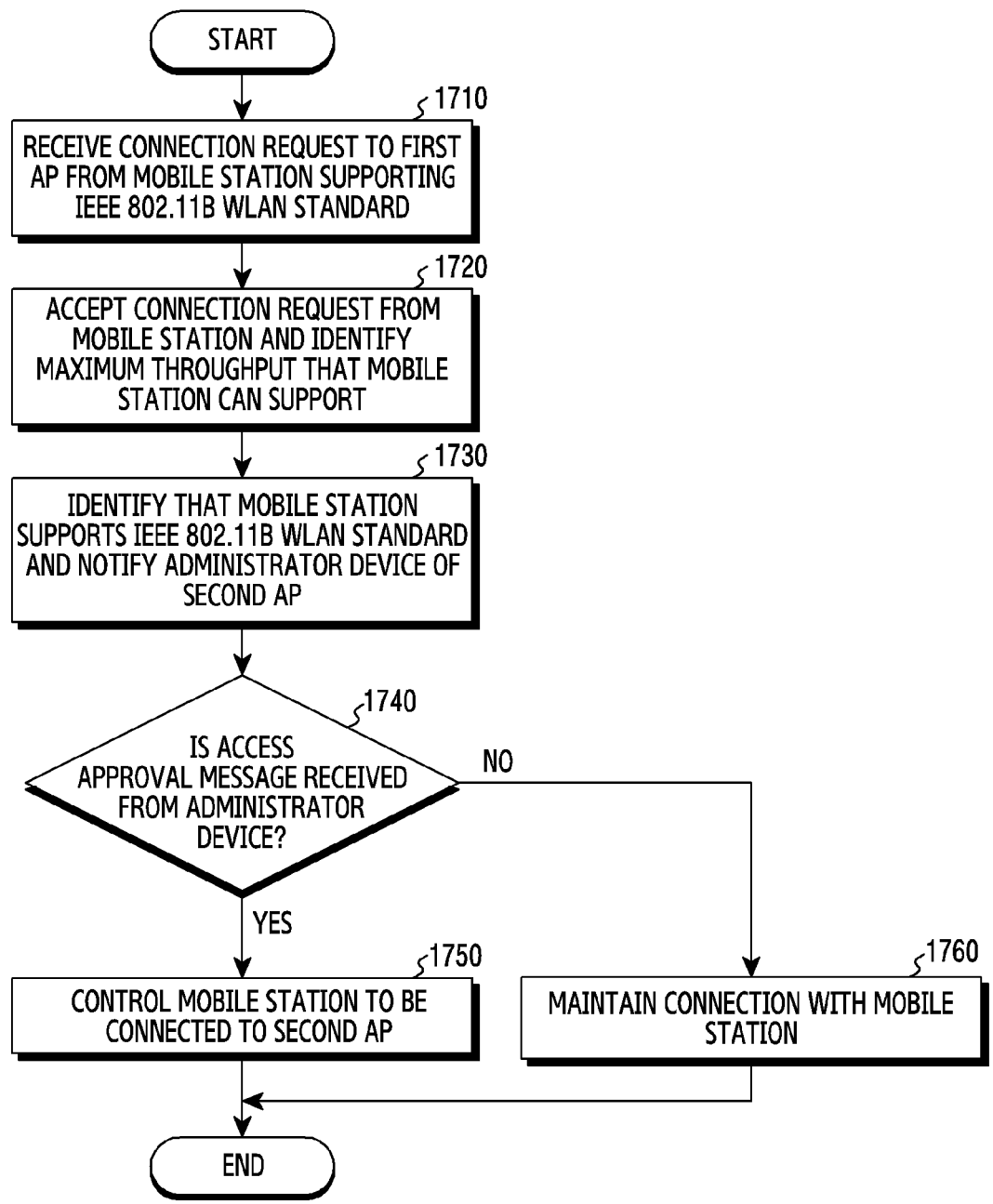
FIG. 17 is a flowchart illustrating the operation of a gatekeeper AP where a mobile station supporting a WLAN standard of IEEE 802.11b attempts a connection to a data-communication AP according to various embodiments of the disclosure.

FIG. 17 is a flowchart illustrating the operation of a gatekeeper AP where a mobile station supporting a WLAN standard of IEEE 802.11b attempts a connection to a data-communication AP according to various embodiments of the disclosure.

In operation 1710, a first AP (e.g., the AP 410 of FIG. 7 or AP1 410-1 of FIG. 8) may receive a connection request to the first AP from a mobile station (e.g., the electronic device 101 of FIG. 1, the electronic device 201 of FIG. 2, or STA1 870 of FIG. 8) supporting a WLAN standard of IEEE 802.11b. For example, the first AP may operate as a gatekeeper AP and can support IEEE 802.11b/g/n WLAN standards. The second AP may operate as a data-communication AP and may be activated to support the IEEE 802.11n WLAN standard. A cycle on which the second AP (e.g., the AP 410 of FIG. 7 or AP2 410-2 of FIG. 8) transmits a management frame and/or a beacon frame may be set to be shorter than that of the first AP. The connection request may include information about a WLAN standard (e.g., IEEE 802.11b) that the mobile station can support.

In operation 1720, the first AP may accept the connection request from the mobile station and may identify the maximum throughput that the mobile station can support. For example, the first AP may identify the WLAN standard that the mobile station can support from the information included in the connection request from the mobile station and accordingly may identify the maximum throughput that the mobile station can support.

In operation 1730, the first AP may identify that the mobile station supports the IEEE 802.11b WLAN standard and may then notify an administrator device of the second AP that a mobile station supporting a WLAN standard not belonging to a specified condition attempts to access the second AP. The first AP may have information about the WLAN standard activated by the second AP and may compare the WLAN standard activated by the second AP with the WLAN standard that the mobile station can support. Although not shown, the administrator device (e.g., the electronic device 101 of FIG. 1, the electronic device 201 of FIG. 2, or STA2 880 of FIG. 8) may display a message on a display in response to a notification of an attempt of the mobile station to connect. The message may include information about the WLAN standard of the mobile station that attempts to connect, information indicating that a low-speed device attempts to connect, or a UI for receiving an input about whether to allow access.

In operation 1740, the first AP may determine whether an access approval message is received from the administrator device. For example, the administrator device may receive an input to determine whether to allow the access or may independently determine whether to allow the access. The administrator device may transmit an access approval message to the first AP corresponding to an approval for the access of the mobile station to the second AP. The first AP may receive the access approval message from the administrator device.

When the access approval message is received from the administrator device, the first AP may control the mobile station to be connected to the second AP in operation 1750. To establish a connection between the second AP and the mobile station, the mobile station may be registered in a blacklist of the first AP and in a whitelist of the second AP. Further, to establish the connection between the second AP and the mobile station, the first AP may request the second AP to change a configuration so as to support the IEEE 802.11b WLAN standard. For example, in response to a request from the first AP, the second AP, in which the IEEE 802.11n WLAN standard is activated, may activate the IEEE 802.11b WLAN standard in order to exchange data with the mobile station. The second AP may set a non-ERP present bit in an ERP information element in order to establish a connection with the mobile station supporting the IEEE 802.11b WLAN standard and may change a cycle on which a management frame and/or a beacon frame is transmitted in order to transmit a management frame and/or a beacon frame according to a cycle corresponding to the IEEE 802.11b WLAN standard. When the mobile station supports IEEE 802.11k/r/v Wi-Fi protocols, the mobile station may perform disconnection and may establish a connection in a seamless manner through roaming from the first AP to the second AP without performing any additional authentication procedure.

When no access approval message is received from the administrator device, the mobile station may maintain a connection with the first AP instead of connecting to the second AP in operation 1760.

Figure 18:
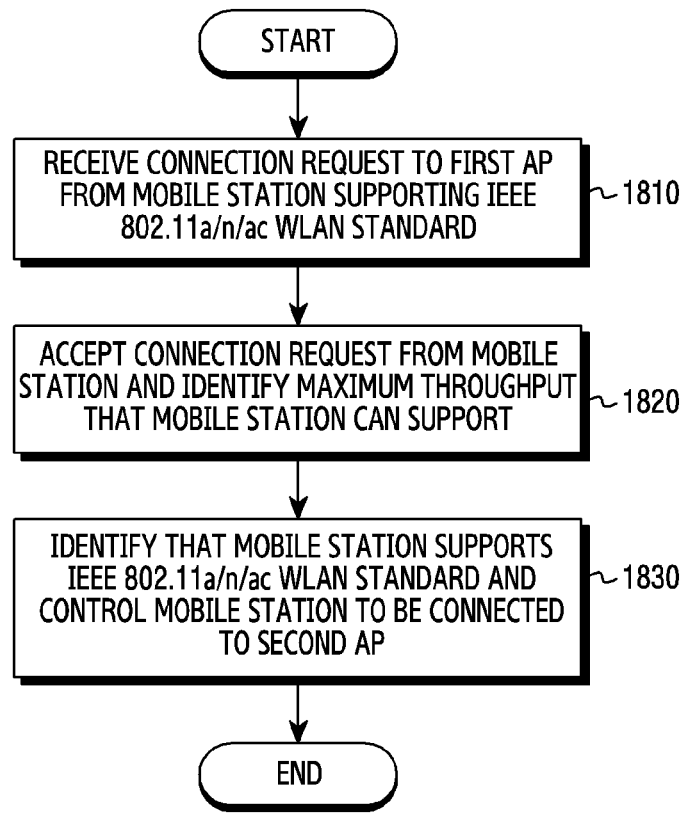
FIG. 18 is a flowchart illustrating the operation of a gatekeeper AP where a mobile station attempts a connection to a data-communication AP in a high-frequency band according to various embodiments of the disclosure.

FIG. 18 is a flowchart illustrating the operation of a first AP where a mobile station attempts a connection to a data-communication AP in a high-frequency band (e.g., 5 GHz) according to various embodiments of the disclosure.

In operation 1810, the first AP (e.g., the AP 410 of FIG. 7 or AP1 410-1 of FIG. 8) may receive a connection request to the first AP from a mobile station (e.g., the electronic device 101 of FIG. 1, the electronic device 201 of FIG. 2, or STA1 870 of FIG. 8) supporting IEEE 802.11a/n/ac WLAN standards. For example, the first AP may operate as a gatekeeper AP and can support IEEE 802.11a/n/ac WLAN standards. The connection request may include information about a WLAN standard (e.g., IEEE 802.11a/n/ac) that the mobile station can support.

In operation 1820, the first AP may accept the connection request from the mobile station and may identify the maximum throughput that the mobile station can support. For example, the first AP may identify the WLAN standard that the mobile station can support from the information included in the connection request from the mobile station and accordingly may identify the maximum throughput that the mobile station can support.

In operation 1830, the first AP may identify that the mobile station supports the IEEE 802.11a/n/ac WLAN standards and may then control the mobile station to be connected to a second AP (e.g., the AP 410 of FIG. 7 or AP2 410-2 of FIG. 8). For example, the second AP may operate as a data-communication AP and may be activated to support the IEEE 802.11a/n/ac WLAN standards. Since the second AP is a data-communication AP and does not directly receive a connection request from a mobile station, a cycle on which the second AP transmits a management frame and/or a beacon frame may be set to be shorter than that of the first AP. Since the mobile station attempting to connect to the second AP supports the IEEE 802.11a/n/ac WLAN standards activated by the second AP, the second AP may establish a connection with the mobile station without changing a configuration to support a different version of the Wi-Fi protocols. To establish a connection between the second AP and the mobile station, the mobile station may be registered in a blacklist of the first AP and in a whitelist of the second AP. When the mobile station supports IEEE 802.11k/r/v Wi-Fi protocols, the mobile station may perform disconnection and may establish a connection in a seamless manner through roaming from the first AP to the second AP without performing any additional authentication procedure.

Figure 19A:
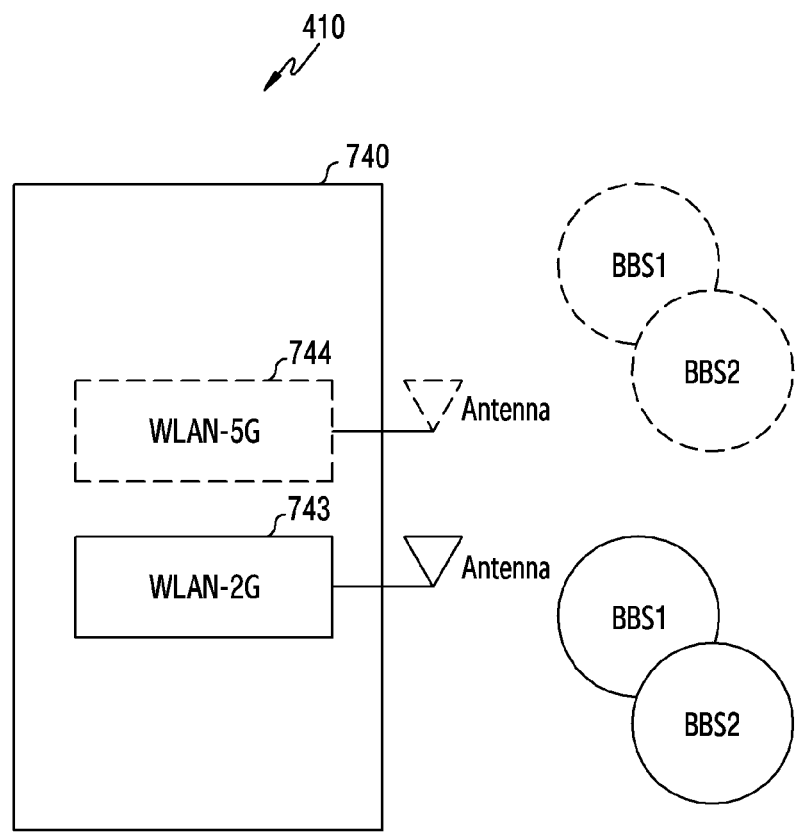
FIG. 19A and FIG. 19B schematically illustrate a signal transmitted by each antenna of one AP when the AP operates a plurality of BSSs.
Figure 19B:
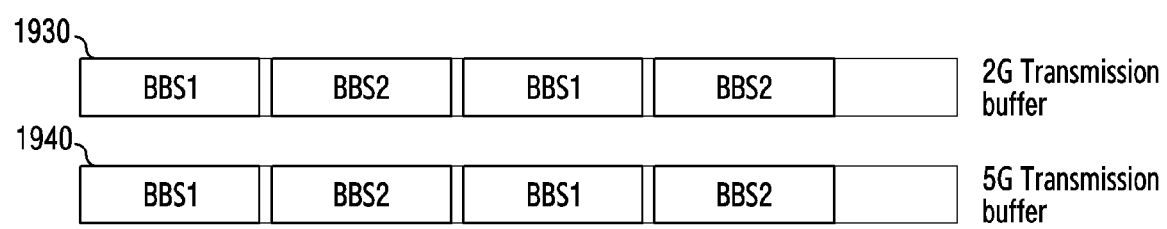

FIG. 19A and FIG. 19B schematically illustrate a signal transmitted by each antenna of one AP when the AP operates a plurality of BSSs.

Referring to FIG. 19A, a communication unit 740 of an AP 410 (e.g., the AP 410 of FIG. 7 or AP1 410-1 of FIG. 8) may include a WLAN chip 744 for a 5 GHz band or a WLAN chip 743 for a 2 GHz band. The WLAN chip 744 and the WLAN chip 743 may support communication in the 5 GHz band and communication in the 2 GHz band, respectively, and may each manage a plurality of BSSs (e.g., the BSS 400 of FIG. 4). For example, one WLAN chip 744 may manage a plurality of BSSs, and one WLAN chip 743 may manage a plurality of BSSs.

According to one embodiment, in order to provide a plurality of BSSs in the same band (2 GHz), the WLAN chip 744 may generate a virtual interface in addition to an existing interface. The WLAN chip 744 may assign a virtual MAC address to the generated virtual interface. The WLAN chip 744 may transmit a signal including an existing MAC address through the existing interface. The WLAN chip 744 may transmit a signal including the newly generated virtual MAC address through the virtual interface. Since a BSS is distinguished by an MAC address, the WLAN chip 744 may transmit signals including different MAC addresses, thereby providing a plurality of BSSs. The WLAN chip 743 may also provide a plurality of BSSs in the 5 GHz band in a similar manner to that of the WLAN 744.

FIG. 19B illustrates frames for a plurality of BSSs scheduled in each of a transmission buffer 1930 of the WLAN chip 744 and a transmission buffer 1940 of the WLAN chip 743. Referring to FIG. 19B, frames for BSS1 (e.g., the BSS 400 of FIG. 4) and frames for BSS2 (e.g., the BSS 400 of FIG. 4) may be scheduled in the transmission buffer 1930 to be alternately transmitted. Frames for BSS1 and frames for BSS2 may be scheduled in the transmission buffer 1940 to be alternately transmitted. However, the scheduling illustrated in FIG. 19B is provided for illustrative purposes, and frames for BSS1 and BSS2 may be scheduled in each of the transmission buffers 1930 and 1940 to be transmitted in any order.

Figure 20A:
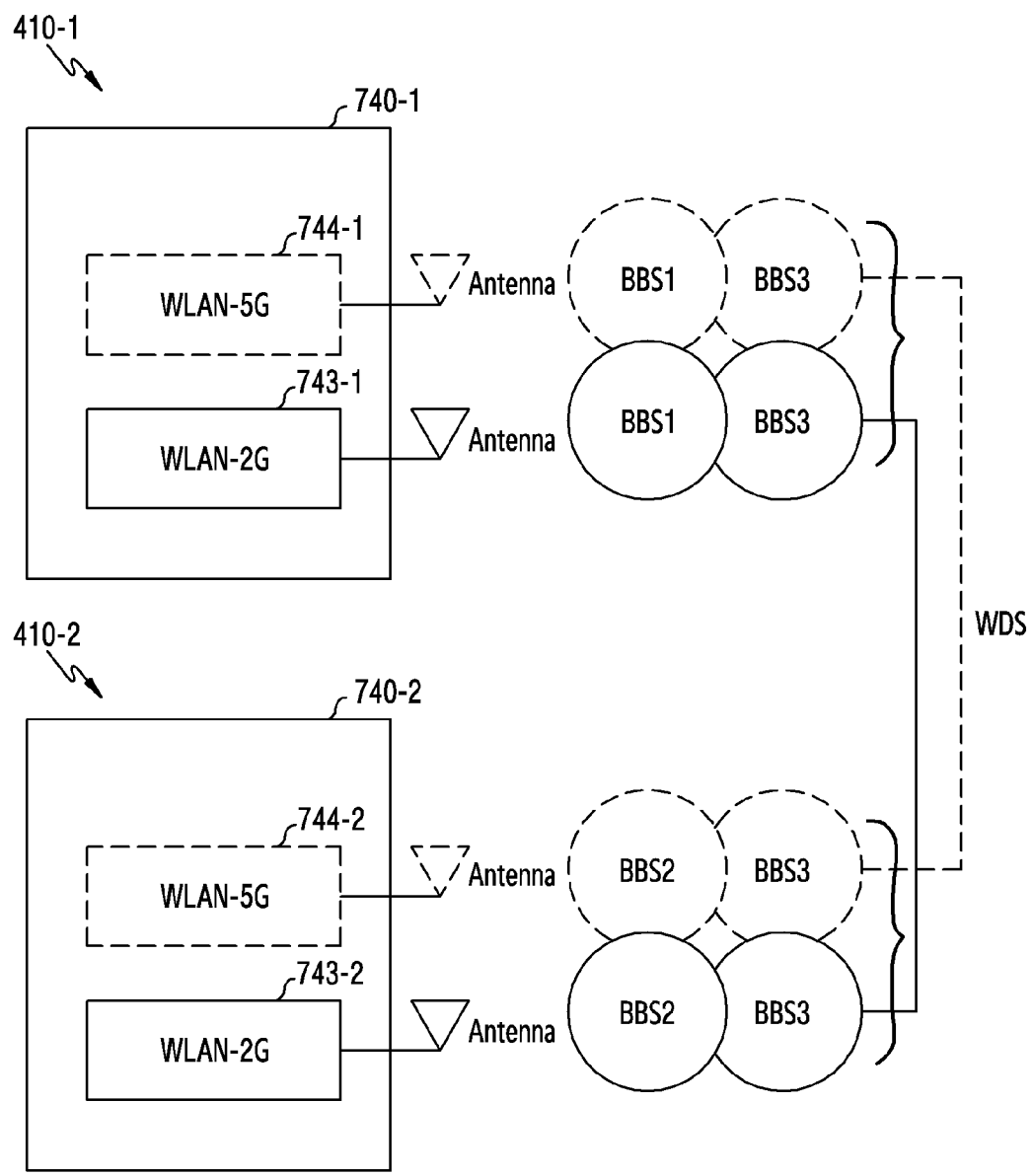
FIG. 20A and FIG. 20B schematically illustrate a signal transmitted by each AP when each of a plurality of APs operates a BSS.
Figure 20B:
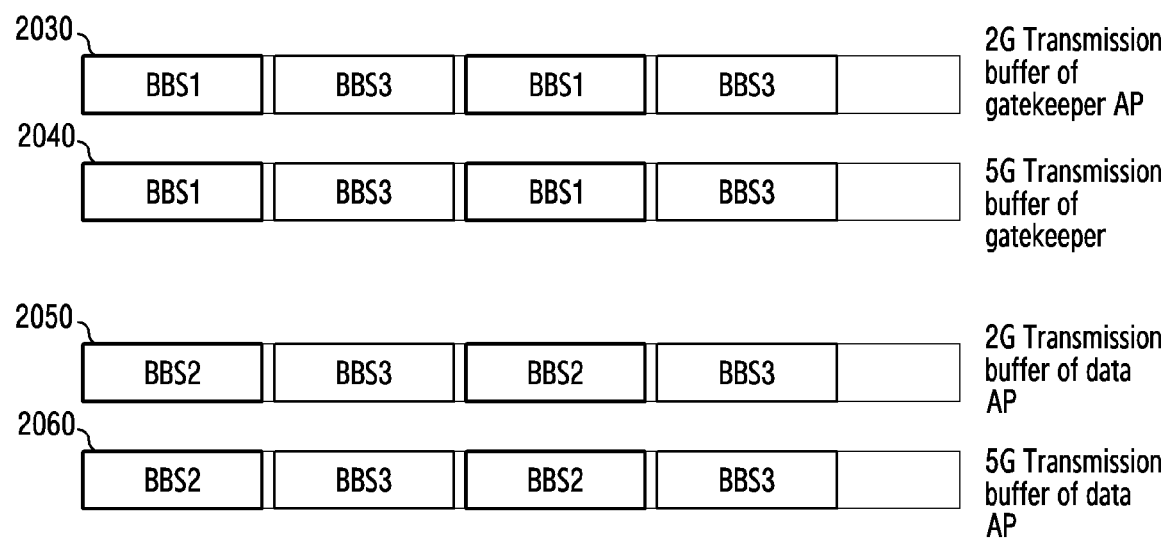

FIG. 20A and FIG. 20B schematically illustrate a signal transmitted by each AP when each of a plurality of APs operates a BSS.

Referring to FIG. 20A, a communication unit 740-1 of AP1 410-1 (e.g., the AP 410 of FIG. 7 or AP1 410-1 of FIG. 8) may include a WLAN chip 744-1 for a 5 GHz band or a WLAN chip 743-1 for a 2 GHz band. The WLAN chip 744-1 and the WLAN chip 743-1 may manage the same BSS1 (e.g., the BSS 400 of FIG. 4) in the 5 GHz band and in the 2 GHz band, respectively. For example, both the WLAN chip 744-1 and the WLN chip 743-1 may manage BBS1. A communication unit 740-2 of AP2 410-2 (e.g., the AP 410 of FIG. 7 or AP2 410-2 of FIG. 8) may include a WLAN chip 744-2 for a 5 GHz band or a WLAN chip 743-2 for a 2 GHz band. Both the WLAN chip 744-2 and the WLAN chip 743-2 may manage BBS2 (e.g., the BSS 400 in FIG. 4).

According to various embodiments of the disclosure, a wireless connection may be established by a WDS between AP1 410-1 and AP2 410-2, and AP1 410-1 and AP2 410-2 may exchange information through the WDS. For AP1 410-1 and AP2 410-2 to communicate through the WDS, each of the WLAN chips 744-1, 743-1, 744-2, and 743-2 may further manage BSS3 (e.g., the BSS 400 of FIG. 4) for the WDS. As described in FIG. 19A, each of the WLAN chips 744-1, 743-1, 744-2, and 743-2 may generate a virtual interface and may transmit a signal including the MAC address of BSS3.

FIG. 20B illustrates frames for a plurality of BSSs scheduled in transmission buffers 2030, 2040, 2050, and 2060 of the respective WLAN chips 744-1, 743-1, 744-2, and 743-2. Referring to FIG. 20B, frames for BSS1 and frames for BSS3 (e.g., the BSS 400 of FIG. 4) may be scheduled in transmission buffers 2030 and 2040 of AP1 410-1 (e.g., the AP 410 of FIG. 7 or AP1 410-1 of FIG. 8) to be alternately transmitted. Frames for BSS2 (e.g., the BSS 400 of FIG. 4) and frames for BSS3 may be scheduled in transmission buffers 2050 and 2050 of AP2 410-2 (e.g., the AP 410 of FIG. 7 or AP2 410-2 of FIG. 8) to be alternately transmitted. However, the scheduling illustrated in FIG. 20B is provided for illustrative purposes, and frames for BSS1 (e.g., the BSS 400 of FIG. 4), BSS2, and BSS3 may be scheduled in each of the transmission buffers 2030, 2040, 2050, and 2060 to be transmitted in any order.

According to other embodiments of the disclosure, AP1 410-1 and AP2 410-2 may be connected in a wired manner. In this case, since AP1 410-1 and AP2 410-2 can use a wired connection for mutual communication instead of a connection via a WDS, each of the WLAN chips 744-1, 743-1, 744-2, and 743-2 does not need to manage BSS3. Since the WLAN chips 744-1 and 743-1 may transmit only frames for BSS1 and the WLAN chips 744-2 and 743-2 may transmit only frames for BSS2, frames only for BSS1 may be scheduled in the transmission buffers 2030 and 2040 and frames only for BSS2 may be scheduled in the transmission buffers 2050 and 2060.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an

The invention claimed is:
1. A wireless communication system comprising:
a first access point (AP) comprising a first wireless fidelity (Wi-Fi) communication circuit providing a first basic service set (BSS); and
a second AP configured to be wirelessly connected with the first AP and comprising a second Wi-Fi communication circuit providing a second BSS,
wherein the first Wi-Fi communication circuit is configured to:

wirelessly receive a first connection request from a mobile station;
wirelessly exchange credential information with the mobile station;
block a wireless connection with the mobile station after exchanging the credential information; and
provide at least some of the credential information to the second AP,
the second Wi-Fi communication circuit is configured to:
receive at least the some of the credential information from the first AP;
wirelessly receive a second connection request from the mobile station;
establish a wireless connection with the mobile station using at least the some of the credential information without exchanging additional credential information with the mobile station; and
exchange data with the mobile station through the established wireless connection,
wherein the first Wi-Fi communication circuit is configured to provide the first BSS using a first frequency band and a first medium access control (MAC) address, and the second Wi-Fi communication circuit is configured to provide the second BSS using the first frequency band and a second MAC address different from the first MAC address, and
wherein the second Wi-Fi communication circuit provides, to the mobile station, a data packet comprising a frame that comprises a header comprising information for supporting a plurality of wireless local area network (WLAN) standards and a payload carrying data.

2. The wireless communication system as claimed in claim 1, wherein the first Wi-Fi communication circuit is configured to provide the first BSS using a first frequency band, and the second Wi-Fi communication circuit is configured to provide the second BSS using a second frequency band higher than the first frequency band.

3. The wireless communication system as claimed in claim 1, wherein the credential information comprises at least one of a security type, a password, a cryptographic key, a key generated and encoded by an AP, a public key, or a Wi-Fi Protected Setup (WPS).

4. The wireless communication system as claimed in claim 1, wherein the first Wi-Fi communication circuit transmits a first beacon frame on a first cycle, and the second Wi-Fi communication circuit transmits a second beacon frame on a second cycle longer than the first cycle.

5. The wireless communication system as claimed in claim 1, wherein the first Wi-Fi communication circuit transmits information about the second AP to the mobile station, and the second Wi-Fi communication circuit establishes the second wireless connection with the mobile station without a procedure for additionally authenticating the mobile station.

6. A wireless communication system comprising:
a first access point (AP) comprising a first wireless fidelity (Wi-Fi) communication circuit configured to provide a first basic service set (BSS); and
a second AP configured to be wirelessly connected with the first AP and comprising a second Wi-Fi communication circuit configured to provide a second BSS,
wherein the first Wi-Fi communication circuit is configured to:
wirelessly receive, from a first mobile station, a first connection request comprising information about a Wi-Fi protocol version of the first mobile station;
wirelessly provide at least part of the information to a second mobile station;
wirelessly receive an approval for a connection to the first mobile station from the second mobile station; and
block a wireless connection with the first mobile station after receiving the approval, and
the second Wi-Fi communication circuit is configured to:
wirelessly receive the approval from the first Wi-Fi communication circuit;
wirelessly receive a second connection request from the first mobile station;
establish a wireless connection with the first mobile station on the basis of the approval; and
exchange data with the first mobile station through the established wireless connection,
wherein the first Wi-Fi communication circuit is configured to provide the first BSS using a first frequency band and a first medium access control (MAC) address, and the second Wi-Fi communication circuit is configured to provide the second BSS using the first frequency band and a second MAC address different from the first MAC address, and
wherein the second Wi-Fi communication circuit provides, to the mobile station, a data packet comprising a frame that comprises a header comprising information for supporting a plurality of wireless local area network (WLAN) standards and a payload carrying data.

7. The wireless communication system as claimed in claim 6, wherein the first Wi-Fi communication circuit provides the first BSS using a first frequency band, and the second Wi-Fi communication circuit provides the second BSS using a second frequency band higher than the first frequency band.

8. The wireless communication system as claimed in claim 6, wherein the information comprises at least one of a security type, a password, a cryptographic key, a key generated and encoded by an AP, a public key, and a Wi-Fi Protected Setup (WPS).

9. The wireless communication system as claimed in claim 6, wherein the first Wi-Fi communication circuit transmits a first beacon frame on a first cycle, and the second Wi-Fi communication circuit transmits a second beacon frame on a second cycle longer than the first cycle.

10. The wireless communication system as claimed in claim 6, wherein the first Wi-Fi communication circuit transmits information about the second AP to the mobile station, and the second Wi-Fi communication circuit establishes the second wireless connection with the mobile station without a procedure for additionally authenticating the mobile station.

* * * * *